(12) United States Patent
Niwa et al.

(10) Patent No.: US 7,631,200 B2
(45) Date of Patent: Dec. 8, 2009

(54) HOST APPARATUS, DEVICE, AND METHOD FOR CONTROLLING COMMUNICATION SYSTEM

(75) Inventors: Takahiro Niwa, Kasugai (JP); Yuji Yoshida, Kasugai (JP); Masatoshi Ohnishi, Kasugai (JP); Koji Horibe, Kasugai (JP)

(73) Assignee: Fujitsu Microelectronics Limited, Tokyo (JP)

( * ) Notice: Subject to any disclaimer, the term of this patent is extended or adjusted under 35 U.S.C. 154(b) by 271 days.

(21) Appl. No.: 11/328,216

(22) Filed: Jan. 10, 2006

(65) Prior Publication Data

US 2006/0117195 A1  Jun. 1, 2006

Related U.S. Application Data

(63) Continuation of application No. PCT/JP2004/011154, filed on Aug. 4, 2004.

(30) Foreign Application Priority Data

Aug. 28, 2003 (WO) .................... PCT/JP03/010955

(51) Int. Cl.
  *G06F 1/00* (2006.01)
  *G06F 1/32* (2006.01)
  *G05D 3/12* (2006.01)

(52) U.S. Cl. ................. 713/300; 713/320; 700/297
(58) Field of Classification Search ............ 713/300, 713/310, 320
See application file for complete search history.

(56) References Cited

U.S. PATENT DOCUMENTS

| | | | |
|---|---|---|---|
| 5,483,656 A * | 1/1996 | Oprescu et al. ............. 713/320 |
| 5,752,046 A | 5/1998 | Oprescu | |
| 6,526,516 B1 | 2/2003 | Ishikawa et al. | |
| 6,545,775 B1 | 4/2003 | Watanabe et al. | |
| 6,810,481 B1 * | 10/2004 | Kawade et al. .............. 713/300 |
| 2002/0065618 A1 * | 5/2002 | Oh ............................... 702/57 |
| 2003/0088798 A1 * | 5/2003 | Ono et al. .................... 713/310 |
| 2004/0243756 A1 * | 12/2004 | Lin et al. ..................... 710/313 |

FOREIGN PATENT DOCUMENTS

| | | |
|---|---|---|
| JP | 6-183102 A | 7/1994 |
| JP | 7-210274 A | 8/1995 |
| JP | 8-152945 A | 6/1996 |
| JP | 9-34598 A | 2/1997 |
| JP | 10116139 A * | 5/1998 |
| JP | 11-243651 A | 9/1999 |

(Continued)

*Primary Examiner*—Suresh K Suryawanshi
(74) *Attorney, Agent, or Firm*—Arent Fox LLP.

(57) ABSTRACT

A host apparatus that adjusts consumption of a device in accordance with the power supply capability of the host apparatus. The host apparatus includes a plurality of communication ports and devices connected to each communication port. A host controller of the host apparatus communicates with the devices to acquire equipment information including the consumption current of each device. A current supply circuit supplies current to the devices connected to the communication ports. An MPU changes the current supplied from the current supply circuit to the plurality of devices when a total value of the consumption current of a device newly connected to the plurality of communication ports and the consumption current of each device for which connection with the plurality of ports has already been recognized exceeds the current that the current supply circuit is capable of supplying.

6 Claims, 32 Drawing Sheets

FOREIGN PATENT DOCUMENTS

| | | |
|---|---|---|
| JP | 11-316625 A | 11/1999 |
| JP | 2000-148312 A | 5/2000 |
| JP | 2003-330673 A | 11/2000 |
| JP | 2001-022480 A | 1/2001 |
| JP | 2001075682 A * | 3/2001 |
| JP | 2001-223837 A | 8/2001 |
| JP | 2001-242965 A | 9/2001 |
| JP | 2002-149288 A | 5/2002 |
| JP | 2003-195985 A | 7/2003 |

* cited by examiner

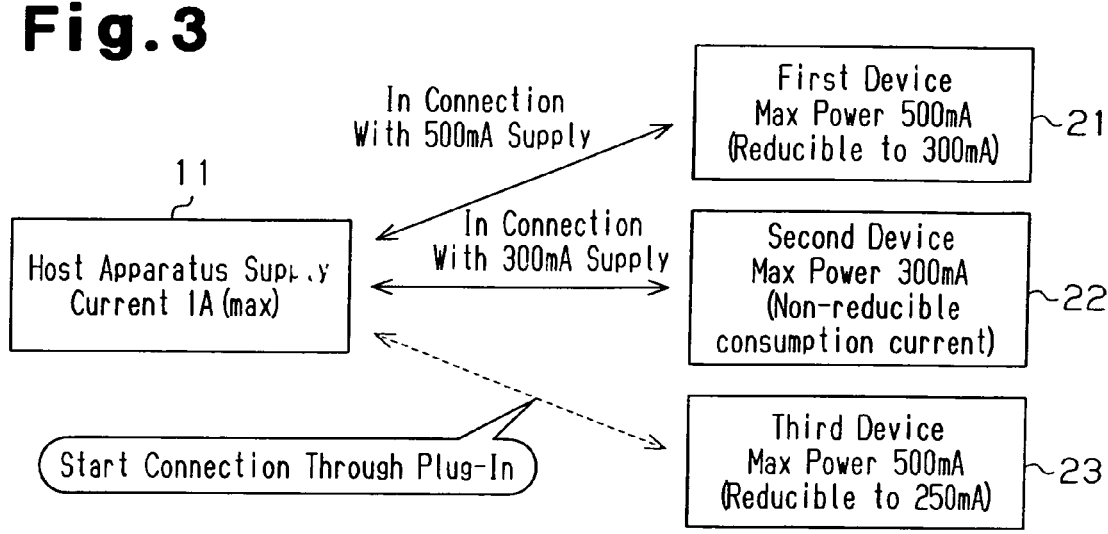
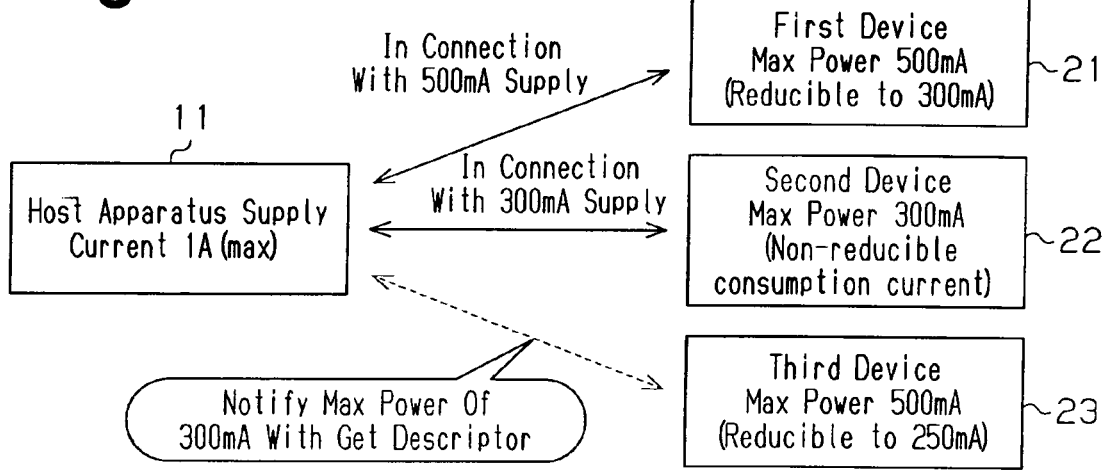
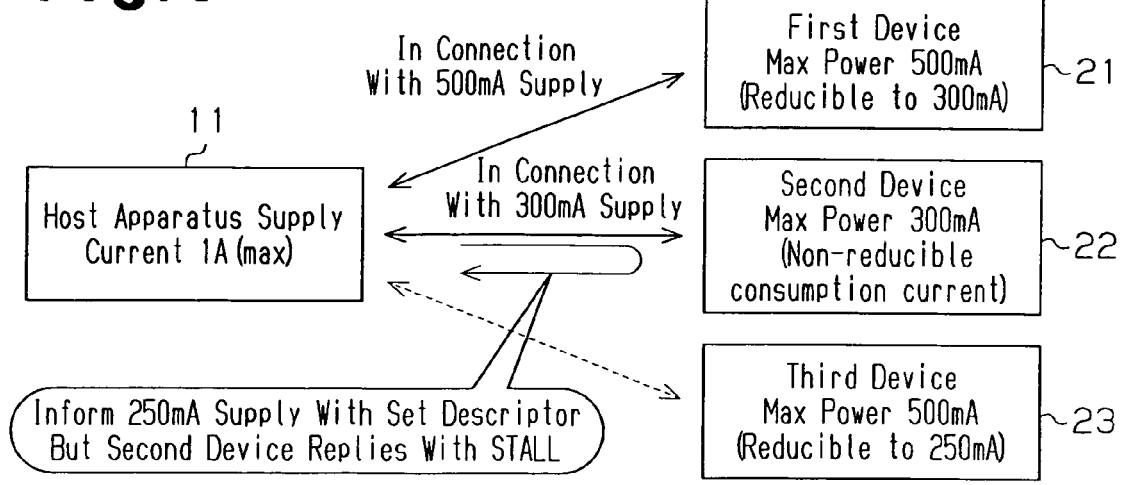

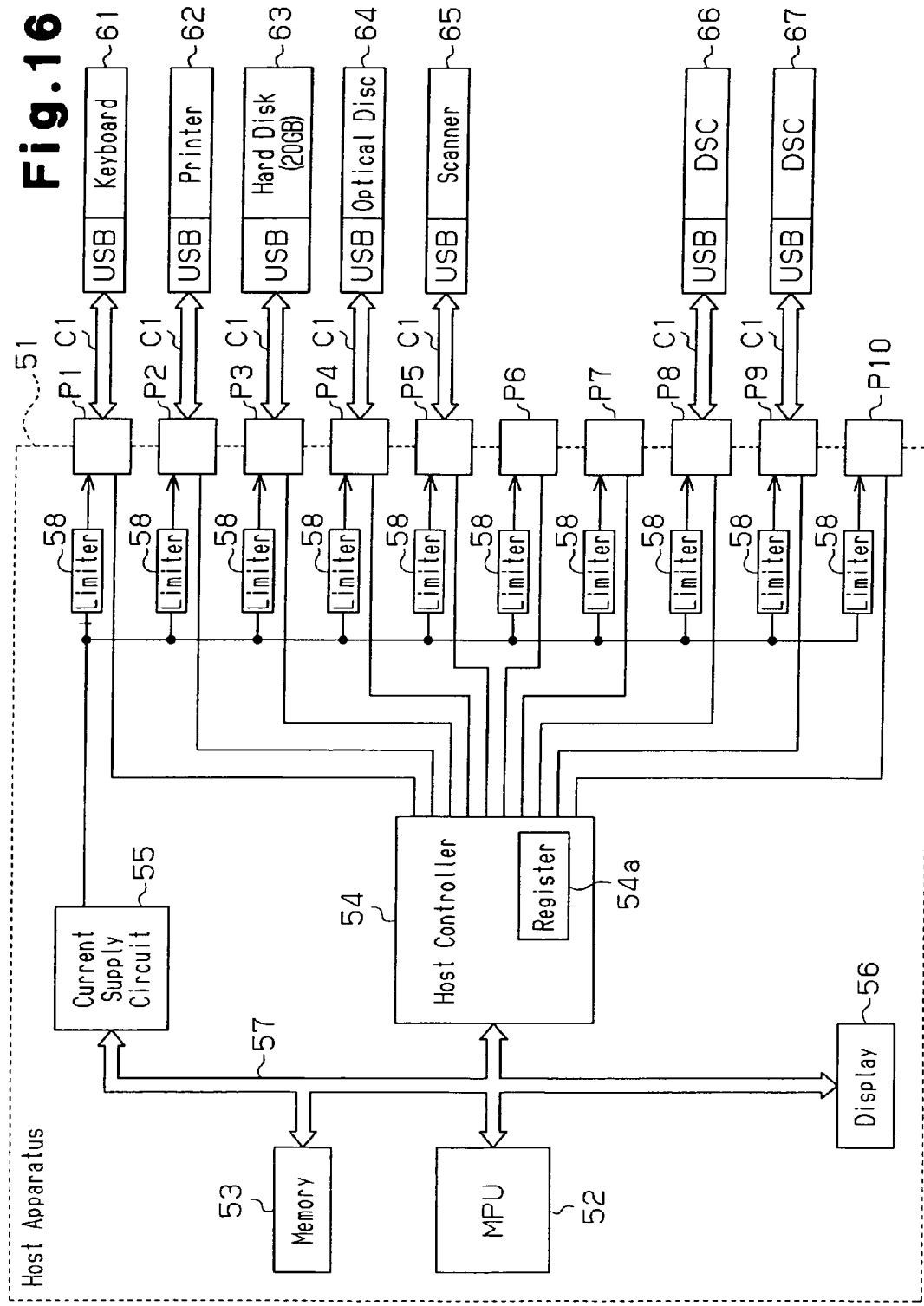

Fig.17

| Selector | | Port No. | Device Name | Manufacturer | Consumption Current (mA) | | State |
|---|---|---|---|---|---|---|---|
| on | off | | | | Requested Value | Present Value | |
| ■ | □ | 1 | Keyboard (+Mouse) | F | 100 | 100 | Active (Red) |
| ■ | □ | 2 | Printer | C | 100 | 100 | Active (Blue) |
| ■ | □ | 3 | Hard Disk (20GB) | F | 500 | 500 | Active (Red) |
| ■ | □ | 4 | Optical Disc | F | 500 | 500 | Active (Red) |
| □ | ■ | 5 | Scanner | E | 300 | 2.5 | suspend |
| □ | □ | 6 | | | 0 | 0 | Not Use |
| □ | □ | 7 | | | 0 | 0 | Not Use |
| □ | ■ | 8 | DSC | N | 200 | 2.5 | suspend |
| ■ | □ | 9 | DSC | S | 250 | 250 | Active (Red) |
| □ | □ | 10 | | | 0 | 0 | Not Use |
| | | Requested Consumption Current and Used Current Of All Ports | | | 1950 | 1455 | |
| | | Tolerable Current And Margin Current | | | 2500 | 1045 | |

W1

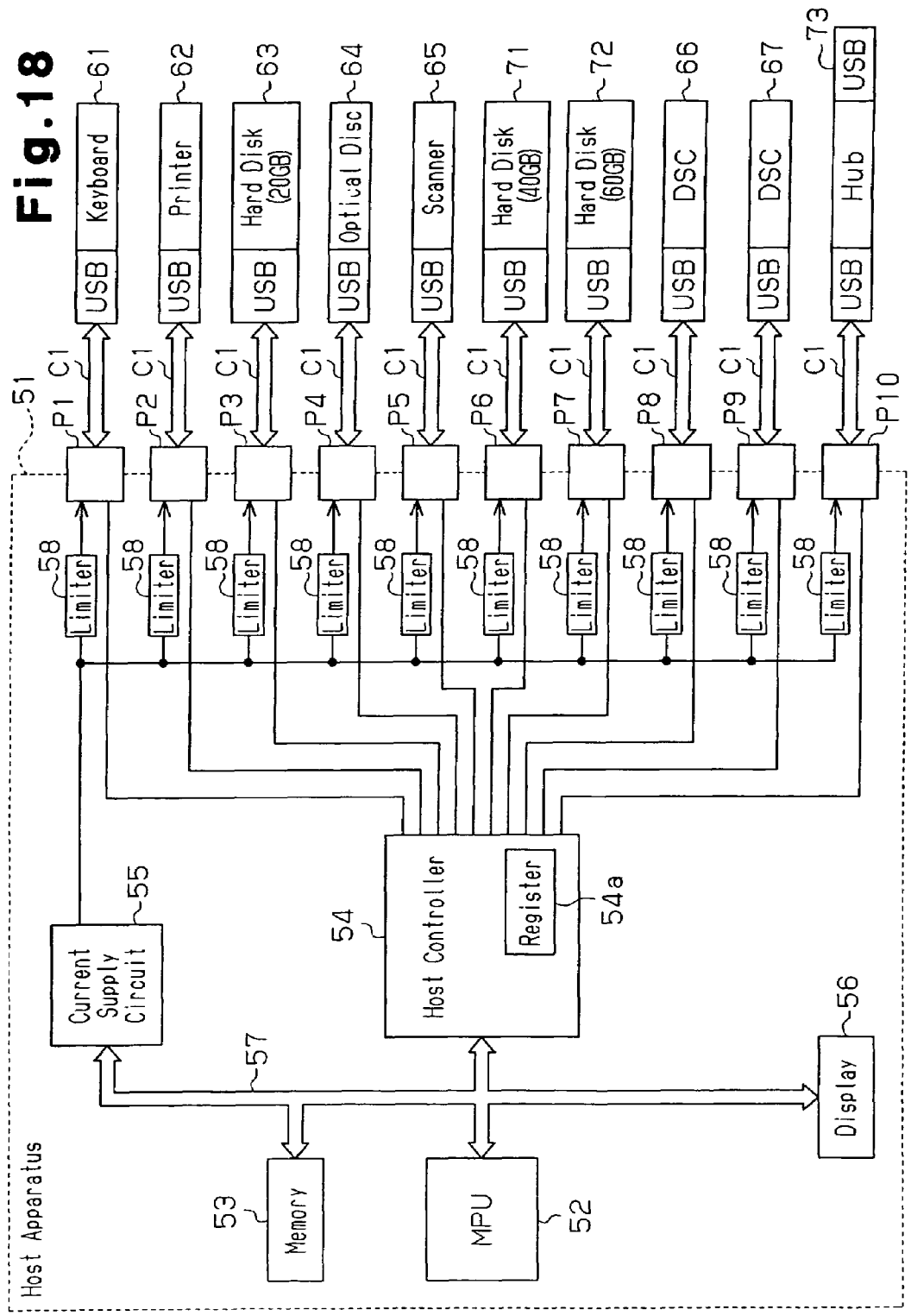

Fig.19

| Selector | | Port No. | Device Name | Manufacturer | Consumption Current (mA) | | State |
|---|---|---|---|---|---|---|---|
| on | off | | | | Requested Value | Present Value | |
| ■ | □ | 1 | Keyboard (+Mouse) | F | 100 | 100 | Active (Red) |
| ■ | □ | 2 | Printer | C | 100 | 100 | Active (Blue) |
| ■ | □ | 3 | Hard Disk (20GB) | F | 500 | 500 | Active (Red) |
| ■ | □ | 4 | Optical Disc | F | 500 | 500 | Active (Red) |
| □ | ■ | 5 | Scanner | E | 300 | 2.5 | suspend |
| □ | □ | 6 | Hard Disk (40GB) | I | 500 | 100 | Wait |
| □ | □ | 7 | Hard Disk (60GB) | M | 500 | 100 | Wait |
| □ | ■ | 8 | DSC | N | 200 | 2.5 | suspend |
| ■ | □ | 9 | DSC | S | 250 | 250 | Active (Red) |
| □ | □ | 10 | Hub | K | 500 | 100 | Wait |
| Requested Consumption Current and Used Current Of All Ports | | | | | 3450 | 1755 | |
| Tolerable Current And Margin Current | | | | | 2500 | 745 | | w2

Fig.20

| Selector | | Port No. | Device Name | Manufacturer | Consumption Current (mA) | | State |
|---|---|---|---|---|---|---|---|
| on | off | | | | Requested Value | Present Value | |
| ■ | □ | 1 | Keyboard (+Mouse) | F | 100 | 100 | Active (Red) |
| ■ | □ | 2 | Printer | C | 100 | 100 | Active (Blue) |
| ■ | □ | 3 | Hard Disk (20GB) | F | 500 | 500 | Active (Red) |
| □ | ■ | 4 | Optical Disc | F | 500 | 2.5 | suspend |
| □ | ■ | 5 | Scanner | E | 300 | 2.5 | suspend |
| ■ | □ | 6 | Hard Disk (40GB) | I | 500 | 500 | Active (Red) |
| ■ | □ | 7 | Hard Disk (60GB) | M | 500 | 500 | Active (Red) |
| □ | ■ | 8 | DSC | N | 200 | 2.5 | suspend |
| □ | ■ | 9 | DSC | S | 250 | 2.5 | suspend |
| ■ | □ | 10 | Hub | K | 500 | 500 | Active (Blue) |
| | | Requested Consumption Current and Used Current Of All Ports | | | 3450 | 2210 | |
| | | Tolerable Current And Margin Current | | | 2500 | 290 | |

Fig.23

| Selector | | Port No. | Device Name | Manufacturer | Consumption Current (mA) | | State |
|---|---|---|---|---|---|---|---|
| on | off | | | | Requested Value | Present Value | |
| ■ | □ | 1 | Optical Disc | F | 100 | 100 | Active (Red) |
| ■ | □ | 2 | Hard Disk (40GB) | I | 100 | 100 | Active (Blue) |
| □ | □ | 3 | | | 0 | 0 | Not Use |
| □ | ■ | 4 | DSC | N | 200 | 2.5 | suspend |
| □ | □ | 5 | | | 0 | 0 | Not Use |
| □ | □ | 6 | | | 0 | 0 | Not Use |
| □ | □ | 7 | | | 0 | 0 | Not Use |
| □ | □ | 8 | | | 0 | 0 | Not Use |
| □ | □ | 9 | | | 0 | 0 | Not Use |
| □ | □ | 10 | | | 0 | 0 | Not Use |
| | | Requested Consumption Current and Used Current Of All Ports | | | 400 | 202.5 | |
| | | Tolerable Current And Margin Current | | | 5000 | 4797.5 | |

| Selector | | Port No. | Device Name | Manufacturer | Consumption Current (mA) | | State |
|---|---|---|---|---|---|---|---|
| on | off | | | | Requested Value | Present Value | |
| ■ | □ | 1 | Optical Disc | F | 100 | 100 | Active (Red) |
| ■ | □ | 2 | Hard Disk (40GB) | I | 100 | 100 | Active (Blue) |
| ■ | □ | 3 | Hub | S | 100 | 100 | Active (Blue) |
| □ | ■ | 4 | DSC | N | 200 | 2.5 | suspend |
| □ | □ | 5 | | | 0 | 0 | Not Use |
| □ | □ | 6 | | | 0 | 0 | Not Use |
| □ | □ | 7 | | | 0 | 0 | Not Use |
| □ | □ | 8 | | | 0 | 0 | Not Use |
| □ | □ | 9 | | | 0 | 0 | Not Use |
| □ | □ | 10 | | | | | |
| Requested Consumption Current and Used Current Of All Ports | | | | | 500 | 302.5 | |
| Tolerable Current And Margin Current | | | | | 5000 | 4697.5 | |

W12

| Selector | | Port No. | Device Name | Manufacturer | Consumption Current (mA) | | State |
|---|---|---|---|---|---|---|---|
| on | off | | | | Requested Value | Present Value | |
| ■ | □ | 1 | Optical Disc | F | 100 | 100 | Active (Red) |
| ■ | □ | 2 | Hard Disk (40GB) | I | 100 | 100 | Active (Blue) |
| □ | □ | 3 | | | 0 | 0 | Not Use |
| □ | ■ | 4 | DSC | N | 200 | 2.5 | suspend |
| Requested Consumption Current and Used Current Of All Ports | | | | | 400 | 202.5 | |
| Tolerable Current And Margin Current | | | | | 400 | 197.5 | |

| Selector | | Port No. | Device Name | Manufacturer | Consumption Current (mA) | | State |
|---|---|---|---|---|---|---|---|
| on | off | | | | Requested Value | Present Value | |
| ■ | □ | 1 | Keyboard (+Mouse) | F | 100 | 100 | Active (Red) |
| □ | ■ | 2 | Printer | C | 100 | 2.5 | suspend |
| ■ | □ | 3 | Hard Disk (20GB) | F | 500 | 500 | Active (Red) |
| □ | ■ | 4 | Optical Disc | F | 500 | 2.5 | suspend |
| □ | ■ | 5 | Scanner | E | 300 | 2.5 | suspend |
| ■ | □ | 6 | Hard Disk (40GB) | I | 500 | 500 | Active (Red) |
| ■ | □ | 7 | Hard Disk (60GB) | M | 500 | 500 | Active (Red) |
| □ | ■ | 8 | DSC | N | 200 | 2.5 | suspend |
| ■ | □ | 9 | DSC | S | 250 | 250 | Active (Red) |
| ■ | □ | 10 | Optical Disc | K | 500 | 500 | Active (Red) |
| | | Requested Consumption Current and Used Current Of All Ports | | | 3450 | 2360 | |
| | | Tolerable Current And Margin Current | | | 2500 | 140 | |

| Selector | | Port No. | Device Name | Manufacturer | Consumption Current (mA) | | State |
|---|---|---|---|---|---|---|---|
| on | off | | | | Requested Value | Present Value | |
| ■ | □ | 1 | Keyboard (+Mouse) | F | 100 | 100 | Active (Red) |
| □ | ■ | 2 | Printer | C | 100 | 2.5 | suspend |
| ■ | □ | 3 | Hard Disk (20GB) | F | 500 | 500 | Active (Red) |
| □ | ■ | 4 | Optical Disc | F | 500 | 2.5 | suspend |
| ■ | □ | 5 | Scanner | E | 300 | 300 | Active (Red) |
| ■ | □ | 6 | Hard Disk (40GB) | I | 500 | 500 | Active (Red) |
| ■ | □ | 7 | Hard Disk (60GB) | M | 500 | 500 | Active (Red) |
| □ | ■ | 8 | DSC | N | 200 | 2.5 | suspend |
| □ | ■ | 9 | DSC | S | 250 | 2.5 | suspend |
| ■ | □ | 10 | Optical Disc | K | 500 | 500 | Active (Red) |
| Requested Consumption Current and Used Current Of All Ports | | | | | 3450 | 2410 | |
| Tolerable Current And Margin Current | | | | | 2500 | 90 | |

| Selector | | Port No. | Device Name | Manufacturer | Consumption Current (mA) | | State |
|---|---|---|---|---|---|---|---|
| on | off | | | | Requested Value | Present Value | |
| ■ | □ | 1 | Keyboard (+Mouse) | F | 100 | 100 | Active (Red) |
| ■ | □ | 2 | Printer | C | 100 | 100 | Active (Blue) |
| ■ | □ | 3 | Hard Disk (20GB) | F | 500 | 500 | Active (Red) |
| □ | ■ | 4 | Optical Disc | F | 500 | 2.5 | suspend |
| □ | ■ | 5 | Scanner | E | 300 | 2.5 | suspend |
| ■ | □ | 6 | Hard Disk (40GB) | I | 500 | 500 | Active (Red) |
| ■ | □ | 7 | Hard Disk (60GB) | M | 500 | 500 | Active (Red) |
| □ | ■ | 8 | DSC | N | 200 | 2.5 | suspend |
| □ | ■ | 9 | DSC | S | 250 | 2.5 | suspend |
| ■ | □ | 10 | Optical Disc | K | 500 | 500 | Active (Red) |
| Requested Consumption Current and Used Current Of All Ports | | | | | 3450 | 2210 | |
| Tolerable Current And Margin Current | | | | | 2500 | 290 | |

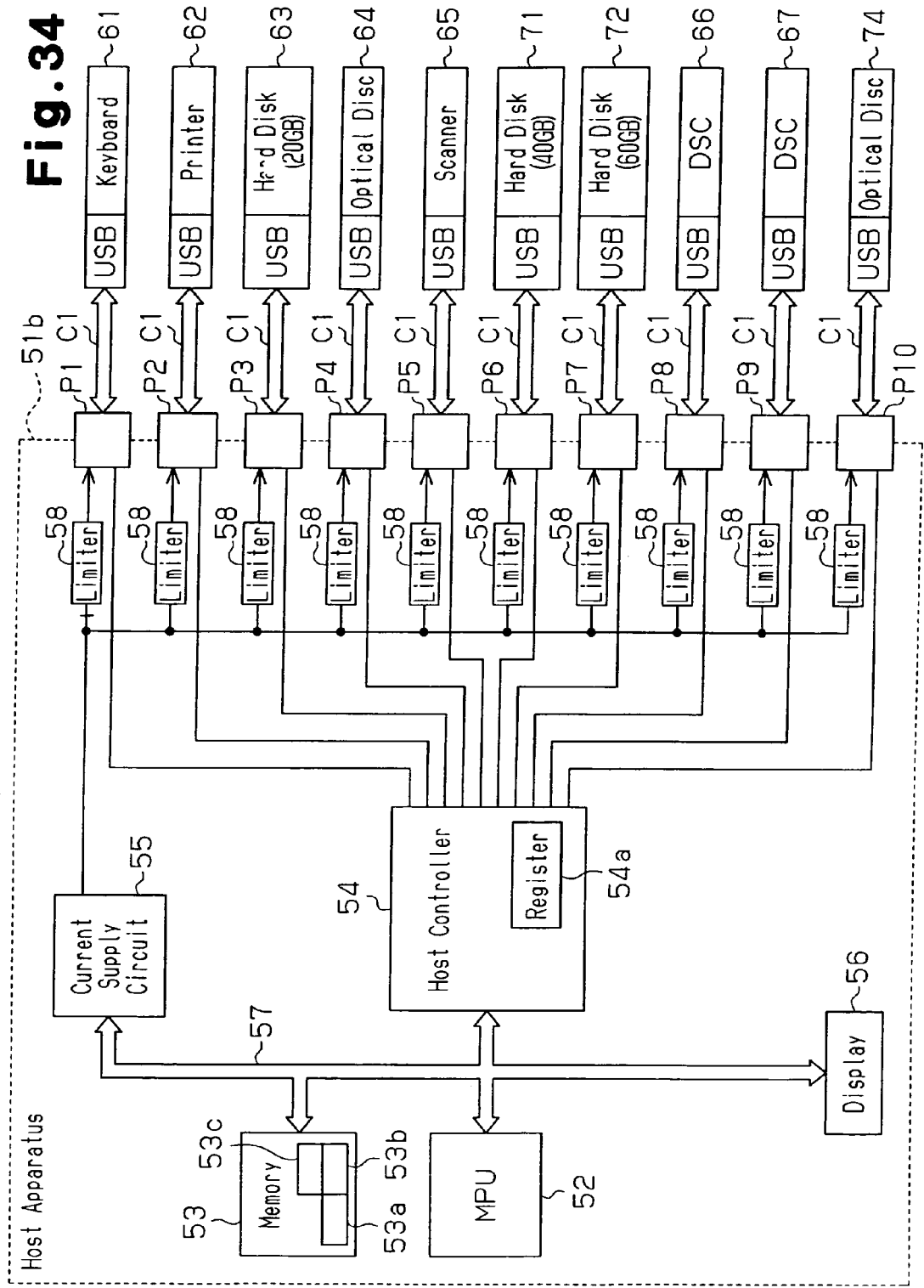

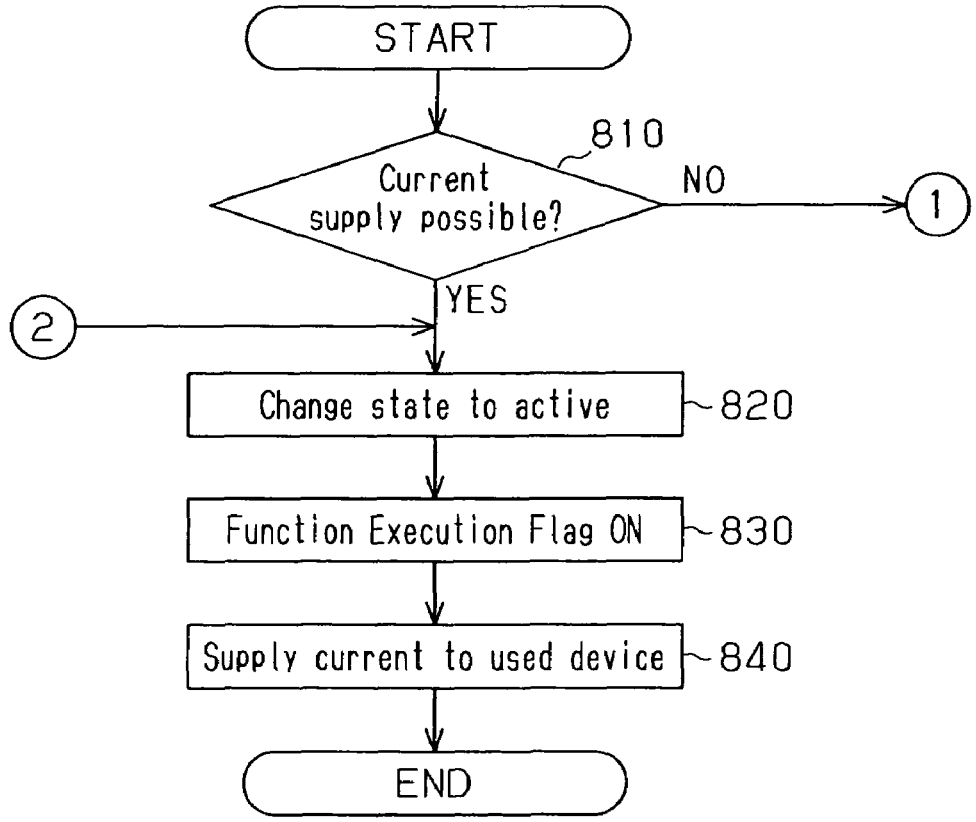

WARNING
Power insufficient for presently performing operation
Select suspend present operation suspend operation in status window or wait until power becomes sufficient ☐1  Suspend present operation
☐2  Suspend operation in status window
     Select selector (ON/OFF) in status window
☐3  Wait until power becomes sufficient

HOST APPARATUS, DEVICE, AND METHOD FOR CONTROLLING COMMUNICATION SYSTEM

CROSS-REFERENCE TO RELATED APPLICATIONS

This application is a continuation of International Patent Application No. PCT/JP2004/011154, filed Aug. 4, 2004, which claims the benefit of priority of International Patent Application No. PCT/JP03/10955, filed Aug. 28, 2003. The disclosures of the prior applications are hereby incorporated in their entirety by reference.

BACKGROUND OF THE ART

The present invention relates to a host apparatus, a device, and a method for controlling a communication system, in which the host apparatus is used in a communication system and the host apparatus and a plurality of devices are connected by way of a bus for performing serial communication and each device is operated by bus-supplied power of the host apparatus.

In the field of personal computers, peripheral devices (device) having a USB (Universal Serial Bus) interface complying with the USB 2.0/1.1 standard, which is a serial interface standard, is becoming a global standard. Further, this standard will continue to spread in the future. The USB standard specifies the capability of supplying current of up to a maximum of 500 mA via the USB cable for every port so that each device is operated by the cable supplied power. That is, in a communication system for performing data communication with the USB interface, power is supplied from the computer (host apparatus), which is provided with the host function, to a device via a USB cable so as to drive the device. Recently, due to the popularization of devices capable of communicating via a USB interface, many devices are connected to the host apparatus by way of the USB interface. In such a communication system, the devices connecting to the host apparatus have increased, and when inappropriate power consumption exceeding the capability (suppliable current) of the host apparatus side occurs in each device, the operation of the entire system becomes unstable. Thus, a technique for avoiding such situation is necessary.

In a communication system connecting a host apparatus and devices with USB interfaces, connection and disconnection of each device are enabled in a state in which the power of the host apparatus is turned on. When connected, a device is instantly recognized in order to enable use of that device. That is, in such a communication system, when a new device is connected to the host apparatus, negotiation is performed between the host apparatus and the device to recognize the newly connected device.

FIG. 40 is a flowchart showing the process executed by the host apparatus in recognizing the newly connected device.

First, in step 1, the host apparatus issues a request command to the device to request equipment information for the device and acquires the equipment information sent from the device in response to the request command. At the point of time when a supply command is issued, current of 100 mA is supplied to the connected device via the USB cable, and a function block for carrying out the negotiation is activated in that device.

The equipment information acquired in step 1 includes information on maximum consumption current required to drive the device, and the host apparatus proceeds to step 2 to determine whether the maximum consumption current can be supplied or not. When determining that the current can be supplied, the host apparatus proceeds to step 3 and recognizes the connected device as a usable device and starts bus power supply (power supply with a bus) to the device. If, on the other, the maximum consumption current of the device is determined in step 2 to be current that cannot be supplied, the host apparatus does not recognize the connected device as a usable device.

In this way, when the maximum consumption current of the connected device exceeds the supply capability of the host apparatus, the device is not recognized by the host apparatus and thus cannot communicate with the host apparatus.

Further, in the communication system, the host apparatus controls all the devices connected to the network of the system. That is, each connected device carries out operations of data transfer and the like in response to instructions from the host apparatus and do not operate when there is no instruction from the host apparatus.

As shown in FIG. 41, the data transfer using the USB interface is carried out in units referred to as transactions, which are configured by a plurality of packets. That is, data transfer is in a communication format in which the data transfer is started by a token packet sent from the host apparatus, and a data packet and a hand shake packet are returned by the device in response to the token packet. Thus, the device cannot transmit any kind of information when ignoring the request from the host apparatus.

There are devices provided with a function for reducing the maximum consumption current and operating in such a state (function for low power consumption mode and the like). However, such devices cannot inform the host apparatus of the information of the reduced current consumption during connection (information that the device itself has a low power consumption mode function). A specific example of a low power consumption mode function includes, in a case of a disc apparatus and the like, a function for lowering power consumption of a motor by reducing the disc rotation speed. In a case of a printer or a scanner, the function of lowering the power consumption would be slowing the printing speed or the scanning speed.

SUMMARY OF THE INVENTION

As mentioned above, whether or not the bus power is suppliable or not with a USB cable is solely determined at the host apparatus side. Thus, when determined that bus power is not suppliable, even when the connected device reduces the current consumption so as to enable operation with the bus power supply, this information cannot be provided to the host apparatus. Thus, the device cannot be activated.

Further, in such a case, when there is a desire for use of a new device, the troublesome task of unplugging a cable and plugging a cable in another cable, in which the USB cable of another device is unplugged and then the USB cable is plugged into the new device, or the connection of a power cable to the device becomes necessary.

A communication system in which the host apparatus and the device are connected with a USB interface, and the device is operated by the bus power supply from the host apparatus is disclosed in Japanese Laid-Open Patent Publication No. 2001-242965 and etc. However, this patent publication and etc. does not propose a technique for avoiding the above problem.

The present invention provides, in a communication system for operating a plurality of devices through bus power supply from the host apparatus, a host apparatus in which the current consumption of the device is adjusted in accordance with the power supply ability of the host apparatus, a device, and a method of controlling the communication system.

One aspect of the present invention is a host apparatus for operating a plurality of devices by supplying power through a plurality of buses that perform serial communication. The host apparatus includes a plurality of communication ports for connection with the plurality of devices. A communication circuit, connected to the plurality of communications ports, acquires plural pieces of equipment information including consumption current of the plurality of devices from the plurality of devices through communication with the plurality of devices. A current supply circuit, connected to the plurality of communication ports, supplies current to the plurality of devices. A control circuit, connected to the communication circuit and the current supply circuit, changes the current supplied from the current supply circuit to the plurality of devices when the total value of the consumption current of a device newly connected to the plurality of communication ports and the consumption current of each device for which connection with the plurality of ports has already been recognized exceeds the current that the current supply circuit is capable of supplying.

Another aspect of the present invention is a host apparatus for operating a plurality of devices by supplying power through a plurality of buses that perform serial communication. The host apparatus includes a plurality of communication ports for connection with the plurality of devices. A communication circuit, connected to the plurality of communication ports, acquires plural pieces of equipment information including consumption current of the plurality of devices through communication with the plurality of devices. A display device, connected to the communication circuit, displays the plural pieces of equipment information and selection information enabling a user to select a used state or an unused state for the plurality of devices connected to the communication ports. A control circuit, connected to the communication circuit and the display device, controls current supplied to each device for each communication port in accordance with the consumption current of the plurality of devices and the selection result of the user based on the selection information.

A further aspect of the present invention is a device for receiving power from a host apparatus through a bus that performs serial communication. The device includes an internal circuit including a communication circuit for performing communication with the host apparatus through the bus and operating based on the communication data transmitted and received by the communication circuit. A control circuit, connected to the internal circuit, reduces the consumption current if the consumption current of the internal circuit exceeds the current that the host apparatus is capable of supplying when the device is connected to the host apparatus.

Another aspect of the present invention is a method for controlling a communication system for supplying power from a host apparatus to a plurality of devices through a plurality of buses that perform serial communication to operate the plurality of devices. The method includes the steps of acquiring equipment information with the host apparatus, including consumption current of each device, from the plurality of devices, and changing the distribution of current supplied from the current supply circuit to the plurality of devices in accordance with the current that the host apparatus is capable of supplying when the total value of the consumption current of a device newly connected to the host apparatus and the consumption current of each device for which connection with the host apparatus has already been recognized exceeds the current that the host apparatus is capable of supplying.

A further aspect of the present invention is a method for controlling a communication system for supplying power from a host apparatus to a device through a bus that performs serial communication to operate the device. The device includes an internal circuit, having a communication circuit for performing communication with the host apparatus, for operating based on communication data transmitted and received by the communication circuit. The method including the step of reducing the consumption current of the internal circuit in accordance with the current the host apparatus is capable of supplying when the consumption current consumed by the internal circuit exceeds the current the host apparatus is capable of supplying.

Another aspect of the present invention is a method for controlling a communication system for supplying power from a host apparatus to a plurality of devices through a plurality of buses that perform serial communication to operate the plurality of devices. The method includes the steps of acquiring equipment information with the host apparatus including consumption current of the plurality of devices from the plurality of devices, displaying on a display device of the host apparatus the equipment information of each device and selection information enabling a user to select a used state or an unused state for each device, and controlling current supplied to each device in accordance with the consumption current of each device that is included in the equipment information and the selection result of the user based on the selection information.

A further aspect of the present invention is a host apparatus for operating a plurality of devices by supplying power through a plurality of buses that perform serial communication. The host apparatus includes a plurality of communication ports for connection with the plurality of devices. A communication circuit, connected to the plurality of communication ports, acquires plural pieces of equipment information including consumption current of the plurality of devices through communication with the plurality of devices. A control circuit, connected to the communication circuit, changes the amount of current supplied from a current supply circuit to the plurality of connected devices when the consumption current amount increases by shifting a device that is in an unused state to a used state and exceeds the current the current supply circuit is capable of supplying.

Another aspect of the present invention is a method for controlling a communication system for supplying power from a host apparatus to a plurality of devices through a plurality of buses that perform serial communication to operate the plurality of devices. The method includes the steps of acquiring equipment information with the host apparatus, which includes consumption current of the plurality of devices, from the plurality of devices, determining with the host apparatus whether or not the supply of current that is in accordance with a requested value of a device that is in the unused state is possible, and changing the amount of current supplied to the plurality of connected devices from the current supply circuit when the supply of current is impossible.

BRIEF DESCRIPTION OF THE DRAWINGS

The invention, together with objects and advantages thereof, may best be understood by reference to the following description of the presently preferred embodiments together with the accompanying drawings in which:

FIGS. 3 to 8 are each an explanatory diagram showing a negotiation performed between the host apparatus and each device;

FIG. 16 is a block circuit diagram showing a connection state of each device to the host apparatus;

FIG. 17 is an explanatory diagram showing a status window;

FIG. 18 is a block circuit diagram showing the connection state of each device to the host apparatus;

FIG. 19 is an explanatory diagram showing a status window;

FIG. 20 is an explanatory diagram showing a status window;

FIG. 23 is an explanatory diagram showing the status window of the hub;

FIG. 25 is an explanatory diagram showing the status window of the hub;

FIG. 31 is an explanatory diagram showing the status window;

FIG. 32 is an explanatory diagram showing the status window;

FIG. 33 is an explanatory diagram showing the status window;

FIG. 34 is a schematic block circuit diagram of a host apparatus according to a seventh embodiment of the present invention;

FIG. 36 is an explanatory diagram showing the state of a function execution flag;

FIG. 37 is a flowchart showing a device controlling process according to an eighth embodiment of the present invention;

DETAILED DESCRIPTION OF THE PREFERRED EMBODIMENTS

Figure 1:
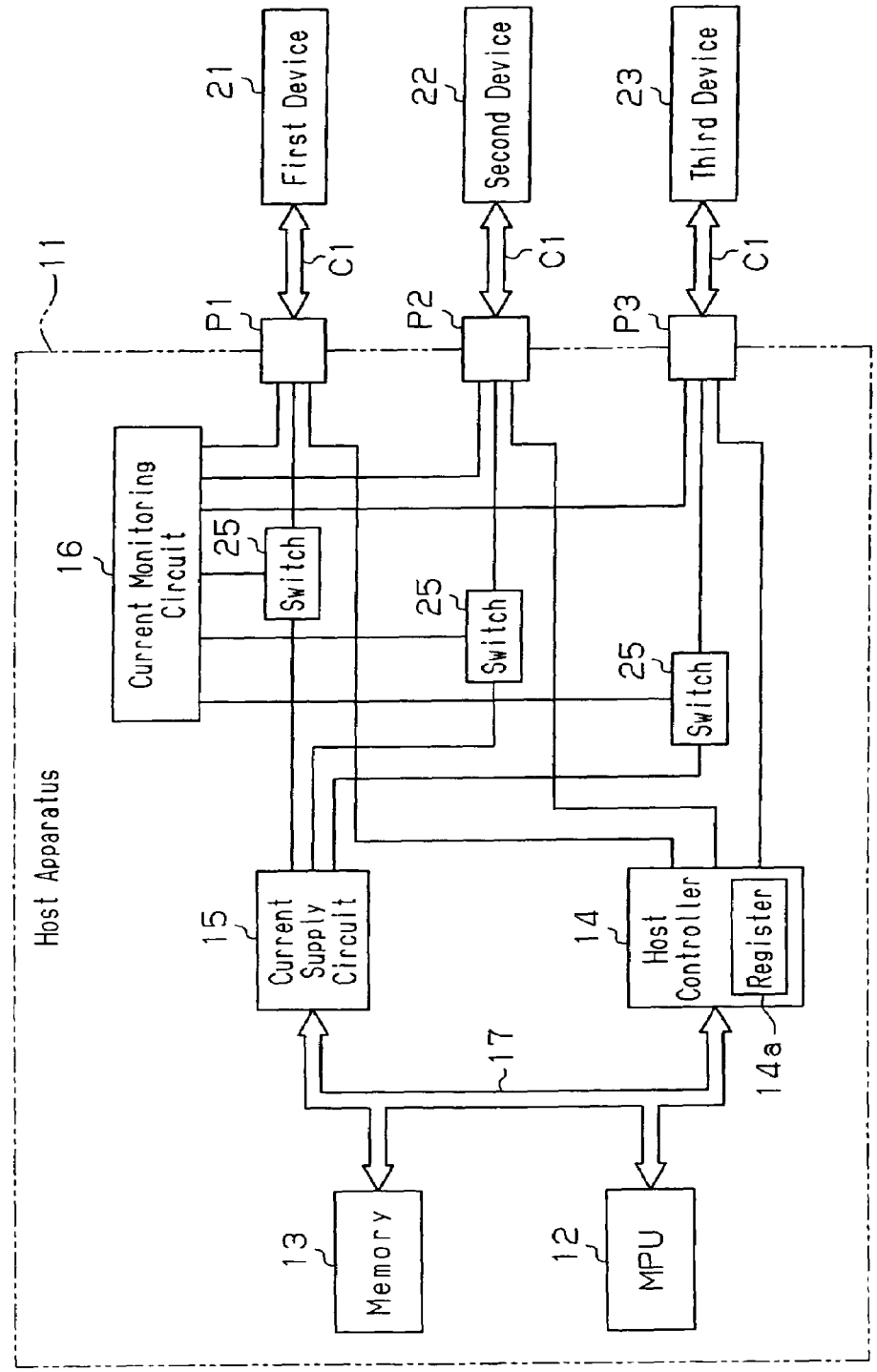
FIG. 1 is a schematic block circuit diagram of a host apparatus according to a first embodiment of the present invention.

A first embodiment of the present invention will now be described with reference to the drawings. FIG. 1 is a schematic block circuit diagram of a host apparatus 11 of the first embodiment.

The host apparatus (more specifically, a personal computer) 11 includes an MPU 12, a memory 13, a host controller 14, a current supply circuit 15, and a current monitoring circuit 16. In the host apparatus 11, the MPU 12 is connected to the memory 13, the host controller 14, and the current supply circuit 15 by an internal bus 17 so that data is transmitted and received between one another. In the host apparatus 11, three communication ports P1 to P3 configure a USB interface, and first to third devices 21 to 23 are connected to the communication ports P1 to P3 by a USB cables C1. Each device 21 to 23 is a bus-powered device that operates with the power supplied via the USB cable C1 from the host apparatus 11.

The MPU 12, which is a control circuit, executes various processes in accordance with programs stored in the memory 13, and controls the host apparatus 11 in a centralized manner. The programs stored in the memory 13 include a communication program, and the host controller 14 and the current supply circuit 15 are controlled by the communication program.

The host controller 14 is a communication circuit complying with the USB standard and controls communication with each device 21 to 23. The host controller 14 is connected to the first to the third devices 21 to 23 by way of each communication port P1 to P3 and the USB cables C1. A register 14a is arranged in the host controller 14, and the equipment information acquired from each device 21 to 23 is stored in the register 14a. More specifically, the host apparatus 11, when each device 21 to 23 is connected to the communication port P1 to P3, performs the process (negotiation with the device 21 to 23) of connection recognition, and stores the obtained equipment information (information including device name or maximum consumption current) in the register 14a of the host controller 14.

The current supply circuit 15 supplies current, which corresponds to the maximum consumption current contained in the equipment information of the register 14a, to each device 21 to 23 via the communication ports P1 to P3 and the USB cable C1. In the first embodiment, a switch circuit 25 is arranged in the middle of the current path connecting the current supply circuit 15 and each communication port P1 to P3.

The current monitoring circuit 16 detects the current flowing through the communication port P1 to P3 and performs monitoring so that over current (current exceeding the maximum consumption current of each device), which is greater than or equal to a predetermined value, does not flow to the device 21 to 23 via the communication port P1 to P3. The current monitoring circuit 16 turns off the switch circuit 25 when over current is detected and electrically disconnects the current supply circuit 15 and the communication port P1 to P3. Thus, when the device 21 malfunctions and over current flows, the current path to the device 21 is broken so as to prevent over current from continuously flowing. Consequently, the operation of the communication system configured by the host apparatus 11 and each device 22, 23 is prevented from becoming unstable.

In the communication processes executed by the MPU 12 of the host apparatus 11, a process for recognizing the connection of a new device of will now be explained with reference to the flowchart of FIG. 2. The process of FIG. 2 starts when one of the devices 21 to 23 is connected to the host apparatus 11. Here, a case in which the third device 23 is newly connected to the host apparatus 11 when the first and the second devices 21 and 22 are in a connection-recognized state, will be explained by way of example.

When the device 23 is connected to the communication port P3 of the host apparatus 11, the MPU 12, after bus resetting in step 100, first proceeds to the following step 110 and performs address setting of each device 21 to 23 including the connected devices 21 and 22. After the completion of address setting, the MPU 12 proceeds to step 120 and acquires the equipment information of the device 23. More specifically, the MPU 12 operates the host controller 14, issues the request command (Get Descriptor) to the newly connected device 23, and in response, stores the equipment information sent from the device 23 in the register 14a of the host controller 14. The equipment information contains information such as equipment name, manufacturer, maximum consumption current, etc.

The MPU 12, in step 130, reads the equipment information for the presently connected devices 21 and 22 and the device 23 from the register 14a and determines whether the maximum consumption current of the device can be supplied or not based on the equipment information. The suppliable current of the current supply circuit 15 is set in advance in the memory 13 as program data, and such suppliable current and the maximum consumption current of the device 23 are compared. If a versatile power source IC is used as the current supply circuit 15, a current measuring circuit for measuring the suppliable current of the current supply circuit 15 is used, and the supply current of the current supply circuit 15 actually measured with the current measuring circuit in the initialization process and etc. of the host apparatus 11 and may be compared with the maximum consumption current of the device 23.

If determined to be suppliable in step 130, the MPU 12 proceeds to step 140 and operates the host controller 14. After issuing a command (Set Configuration) to provide notification to the device 23 that the connection has been recognized, the MPU 12 ends the present process.

If determined as not being suppliable in step 130, the MPU 12 proceeds to step 150 and changes the distribution of the supply current. That is, the MPU 12 changes the distribution of the supply current to each device 21 to 23 including the connected devices 21 and 22 and the new device 23 within a suppliable current range of the current supply circuit 15. However, in step 150, the changing of distribution of the supply current is only planned, and the actual supply current to each device is maintained at the present current value.

In subsequent step 160, the MPU 12 operates the host controller 14 to transmit the changed current value to the device subject to change in supply current. Thereafter, the MPU 12 checks whether or not the device acknowledges the current value (whether or not operation is enabled) in step 170.

More specifically, the MPU 12 issues the set command (Set Descriptor) of the consumption current from the host controller 14 to provide notification of the changed current value. The device receiving the set command returns the ACK packet if the current value set in the set command is a current value that is applicable and returns the STALL packet if it is a current value that is not applicable. The MPU 12 determines whether the device is operable or not based on the returned ACK packet or the STALL packet.

If there is a plurality of devices subject to change, the set command of the consumption current is issued to all of the devices in step 160. In step 170, determination is made whether acknowledgement (ACK packet) has been obtained from all the devices.

When device acknowledgement is obtained in step 170, the MPU 12 proceeds to step 180 and changes the current value supplied from the current supply circuit 15 to each device 21 to 23. After issuing the command (Set configuration) notifying the device 23 of connection recognition in step 140, the present process is ended.

When device acknowledgement is not obtained in step 170, the MPU 12 proceeds to step 190 and determines whether or not re-changing (re-adjustment) of the distribution of the supply current to each device is possible. If determined that re-changing is possible, the MPU 120 returns to step 150 and re-executes the processes from step 150. If it is determined that re-changing is not possible, the MPU 12 proceeds to step 200 and ends the present process without performing recognition (issue of Set Configuration) of the device or newly connected equipment.

A specific example of negotiation performed between the host apparatus 11 and the devices 21 to 23 during the recognition process of a new device will now be explained with reference to FIG. 3 to FIG. 8. In the first embodiment, the maximum supply current that the host apparatus 11 can supply to each device 21 to 23 is 1 A. Further, the maximum consumption current of each device 21 to 23 is 500 mA for the first device 21, 300 mA for the second device and 300 mA for the third device. Further, the first device 21 is provided with a function for reducing the maximum consumption current from 500 mA to 300 mA, and the third device 23 is provided with a function for reducing the maximum consumption current from 300 mA to 250 mA. The second device 22 does not have a function for reducing maximum consumption current and thus cannot change the maximum consumption current from 300 mA.

First, as shown in FIG. 3, the third device 23 is newly connected by plugging in the third device 23 in a state in which the first and the second devices 21 and 22 are already connection-recognized by the host apparatus 11 and each is being operated by the bus-supplied power. Then, as shown in FIG. 4, the host apparatus 11 issues a request command (Get Descriptor) to request a profile (equipment information) for the third device 23. The third device 23 provides the equipment information containing its own parameter (Max Power=300 mA) of the maximum consumption current in response to the request command.

The host apparatus 11 determines whether the maximum consumption current of 300 mA at a specification that it can supply. The host apparatus 11 is already supplying a current of 800 mA in total for the first and the second devices 21 and 22. Thus, the remaining suppliable capability (spec) is 200 mA (=1000−500−300), and it is determined that the maximum consumption current (=300 mA) cannot be supplied to the third device 23.

In the prior art, if the suppliable specification of the host apparatus 11 is exceeded, the newly connected third device 23 cannot be recognized. In the first embodiment, however, the host apparatus 11 requests a specification downgrade for each device 21 to 23 so as not to exceed the suppliable current (=1 A), and checks whether each device 21 to 23 is operable at the consumption current that has undergone the specification downgrade. When each device 21 to 23 is operable, the distribution of supply current to each device 21 to 23 is changed, and the newly connected third device 23 is recognized.

The maximum consumption current field (Max Power Field) of a configuration descriptor is used as a request command (Set Descriptor) for specification downgrade issued from the host apparatus 11 to each device 21 to 23. The host apparatus 11 assigns and issues a current value that is a target specification to the field of maximum consumption current. In the USB standard, the maximum consumption current of the device is defined as an eighth parameter of the configuration descriptor.

In the first embodiment, the total maximum consumption current of each device 21 to 23 is 1100 mA, and when newly connecting the third device 23 in addition to the first and the second devices 21 and 22, 100 mA lacks from the capacity of the suppliable specification (1000 mA) of the host apparatus 11. Thus, the host apparatus 11 starts negotiation to adjust the distribution of the supply current to each device 21 to 23.

The host apparatus 11, for example, reduces 50 mA, which corresponds to the insufficient amount, from the supply current to the first and second devices 21 and 22 to compensate for the lacking 100 mA.

More specifically, the host apparatus 11 checks the second device 22 for whether it can operate at 250 mA, which has undergone a specification downgrade of 50 mA from the maximum consumption current, as shown in FIG. 5. That is, the host apparatus 11 assigns the data of 250 mA to the maximum consumption current field in the command (Set Descriptor) and transmits the data to the second device 22. However, the second device 22 requires the supply current of 300 mA, and thus responds with a STALL packet indicating this is inapplicable.

Figure 6:
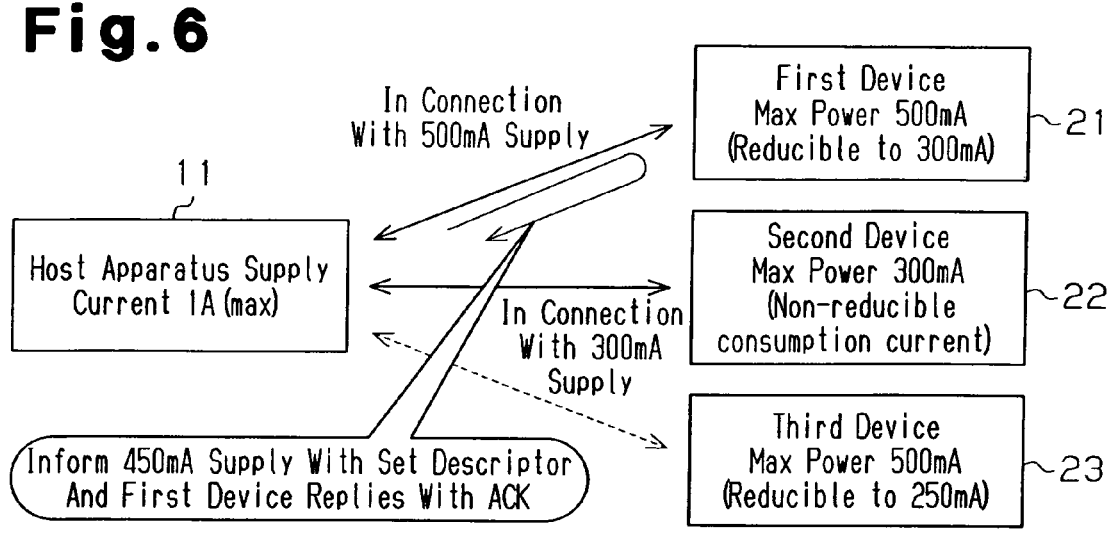

Next, the host apparatus 11, as shown in FIG. 6, contacts the first device 21 to check whether it can operate at 450 mA after undergoing a specification downgrade of 50 mA from the maximum consumption current. Here, the host apparatus 11 assigns the data of 450 mA to the maximum consumption current field in the command (Set Descriptor) and transmits it to the first device 21. This is applicable to the first device 21 even if the supply current is reduced to 300 mA. Thus, the first device 21 responds with an ACK packet indicating an applicable state and acknowledges the operation at the supply current of 450 mA.

Figure 7:
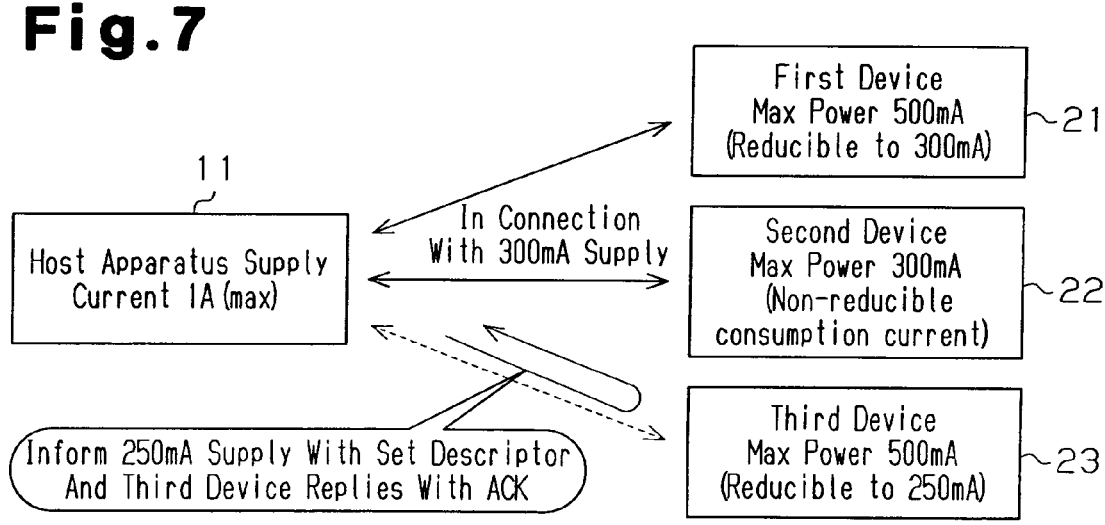

Next, the host apparatus 11, as shown in FIG. 7, contacts the third device 23 to check whether it can operate at 250 mA after undergoing a specification downgrade of 50 mA from the maximum consumption current. Here, the host apparatus 11 assigns the data of 250 mA to the maximum consumption current field in the command (Set Descriptor) and transmits it to the third device 23. This is applicable to the third device 23 even if the supply current is reduced to 250 mA. Thus, the first device 21 responds with an ACK packet indicating an applicable state and acknowledges the operation at the supply current of 250 mA.

Figure 8:
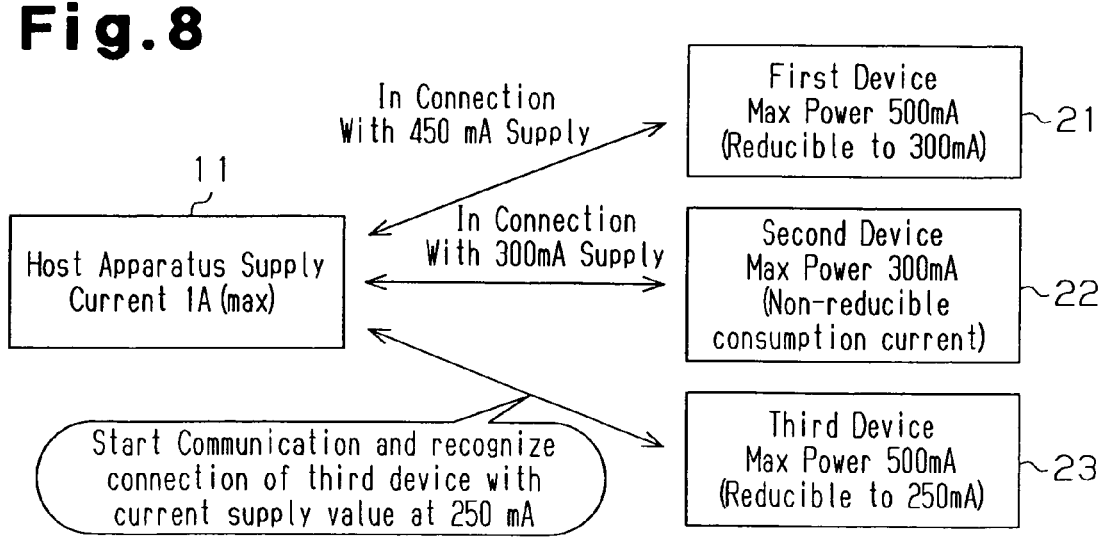

The host apparatus, as shown in FIG. 8, reduces the supply current to the first device 21 to 450 mA and the supply current to the third device 23 to 250 mA. Thus, the first device 21 switches the operation to a low current consumption mode and the third device 23 starts the operation in the low current consumption mode.

In this way, the host apparatus 11 connection-recognizes the third device 23, and the devices 21 to 23 all enter a communicable state.

In the above, a case in which the supply current to the connection-recognized devices 21, 22 is changed when connection recognition of the new device 23 is possible has been explained. In comparison, in a case in which the supply current at which the newly connected device 23 is operable cannot be ensured even if the supply current to the devices 21, 22 is changed, the device 23 cannot be recognized as in the prior art. In this case, the same supply current as before connection of the device 23 continues to be supplied to the first and the second devices 21, 22 so that communication between the host apparatus 11 and the devices 21 and 22 is maintained.

The order of negotiation with each device 21 to 23 explained using FIG. 5 to FIG. 8 can be changed when necessary. That is, in the specific example described above, a change of supply current inquiry is made to the connected device 22, but a reduction of supply current inquiry may first be made to the new device 23, and then a reduction of supply current inquiry may be made to the connected devices 21 and 22 when supply current to the device 23 cannot be adjusted.

Obviously, the reduction current value of 50 mA calculated by the host apparatus 11 is merely an example and negotiation can be performed based on any calculated result. In FIG. 6, a check may be made with the first device 21 on whether or not it can operate at 400 mA after undergoing a specification downgrade of 100 mA from the maximum consumption current. This is applicable to the first device 21 even if the supply current is reduced to 300 mA. Thus, the first device 21 responds with an ACK packet and acknowledges the operation at the supply current of 400 mA. With the reduction of supply current to the first device 21, the supply current of 300 mA to the new device 23 is ensured. Thus, the negotiation (refer to FIG. 7) to reduce the supply current of the new device 23 becomes unnecessary.

The host apparatus 11 of the first embodiment of the present invention has the advantages described below.

(1) In the host apparatus, when the consumption current at the connection-recognized devices 21, 22 and the new device 23 exceeds the supply capability of the current supply circuit 15, the distribution of the supply current to each device 21 to 23 is changed in accordance with the capability. In the first embodiment, in addition to the device 23 newly connected to the host apparatus 11, the supply current to the connection-recognized device 21 is changed. Through the change in distribution of the supply current, the supply current to operate the new device 23 is ensured. When compared to prior art, the number of devices that the host apparatus connection-recognize is thus increased.

(2) Notification of the suppliable current value is provided to the devices 21 to 23 using the command (Set Descriptor) complying with the USB standard. When receiving either the ACK packet or the STALL packet from the devices 21 to 23, determination is made as to whether or not the device can operate. In this way, when performing negotiation to change the supply current to the devices 21 to 23 using the existing command, the program for executing such negotiation is easily formed. This is preferable from a practical standpoint.

(3) The host apparatus 11 includes a current monitoring circuit 16 for detecting the current flowing through the communication ports P1 to P3 and performing monitoring so that over current of a predetermined value or greater does not flow to each device 21 to 23 through the communication ports P1 to P3. When over current is detected in the current monitoring circuit 16, the supply of current to the device is stopped. This prevents the entire communication system from being affected in an adverse manner.

Figure 9:
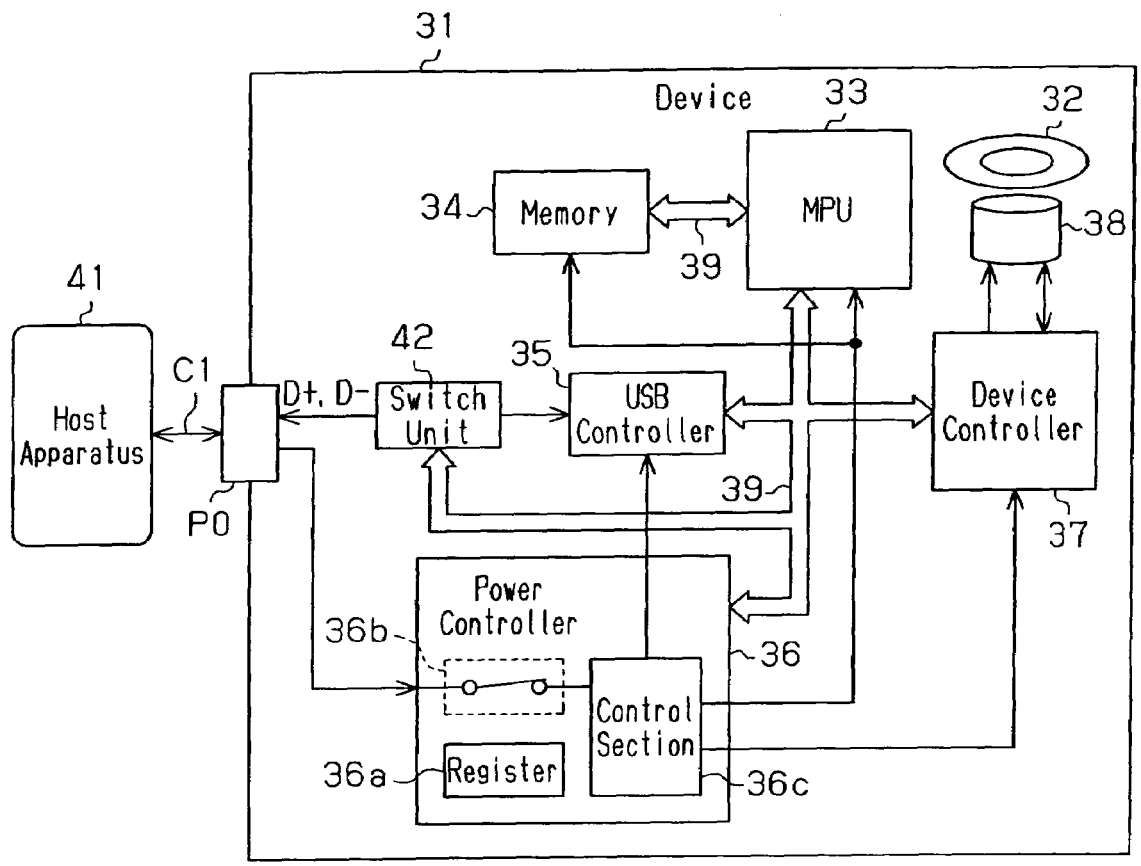
FIG. 9 is a schematic block circuit diagram of a device according to a second embodiment of the present invention.

A second embodiment of the present invention will now be described. FIG. 9 is a schematic block circuit diagram of a device 31 of the second embodiment.

The device 31 is a data recording and reproducing device having an optical disc 32, which functions as a recording medium, and includes an MPU 33, a memory 34, an USB controller 35, a power controller 36, a device controller 37, and a disc rotation motor 38. The MPU 33 is connected to the memory 34, the USB controller 35, the power controller 36, and the device controller 37 by an internal bus 39 so that data is transmitted and received between one another. A USB communication port P0 is arranged in the device 31. The device is connected to a host apparatus 41 by a USB cable C1 that is inserted to the communication port P0. The device 31 of the second embodiment is a bus-powered device that operates with the bus-supplied power from the host apparatus 41.

The MPU 33, which serves as a control circuit, executes various processes in accordance with programs stored in the memory 34 and controls the entire device 31. The programs stored in the memory 34 includes a communication program for controlling the USB controller 35 and the power controller 36 and a data processing program for controlling the device controller 37.

Figure 10:
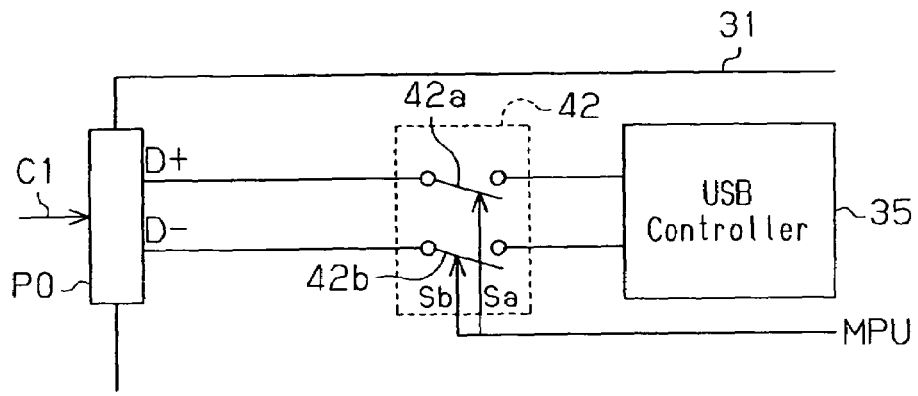
FIG. 10 is a circuit diagram of a switch unit.

The communication port P0 is connected to the USB controller 35 by a switch unit 42, and the communication data from the host apparatus 41 is conveyed to the USB controller 35 through signal lines D+, D− and the switch unit 42. As shown in FIG. 10, the switch unit 42 includes two switch circuits 42a and 42b. The switch circuits 42a and 42b, which are each controlled based on the control signal Sa, Sb from the MPU 33, connect or disconnect the signal lines D+ and D− that connect the communication port P0 and the USB controller 35. The switch unit 42 (each of the switch circuits 42a and 42b) is turned off by the control signals Sa and Sb from the MPU 33 so as to disconnect the device 31 from the host apparatus 41.

The USB controller 35 is a communication circuit complying with the USB standard and controls the communication with the host apparatus 41. More specifically, the USB controller 35 transfers the data (write data) contained in the packet received from the host apparatus 41 to the device controller 37. Further, the USB controller 35 generates a transmission packet based on the transferred data (read data) from the device controller 37 and transmits the data to the host apparatus 41.

The device controller 37 drives the motor 38 and rotates the optical disc 32 to read data from the optical disc 32 or write data to the optical disc 32.

The power controller 36 is connected to the communication port P0 (cable terminal referred to as VBUS), and current is supplied from the host apparatus 41 via the USB cable C1 and the communication port P0. The power controller 36 manages the supply current that is supplied to the internal circuits including the MPU 33, the memory 34, the USB controller 35, and the device controller 37.

More specifically, the power controller 36 includes a register 36a for storing information such as consumption current value of the device 31, a switch circuit 36b for breaking the current path to the internal circuits, and a control section 36c for controlling the supply current to the internal circuits. The control section 36c adjusts the current supplied to the MPU 33, the memory 34, the USB controller 35, and the device controller 37 based on the consumption current value of the register 36a. Further, the switch circuit 36b is turned on or off based on the control signal from the MPU 33. The switch circuit 36b is normally turned on. However, when the device 31 is not connection-recognized by the host apparatus 41, the switch circuit 36b is turned off to shut off the power of the device 31.

Figure 11:
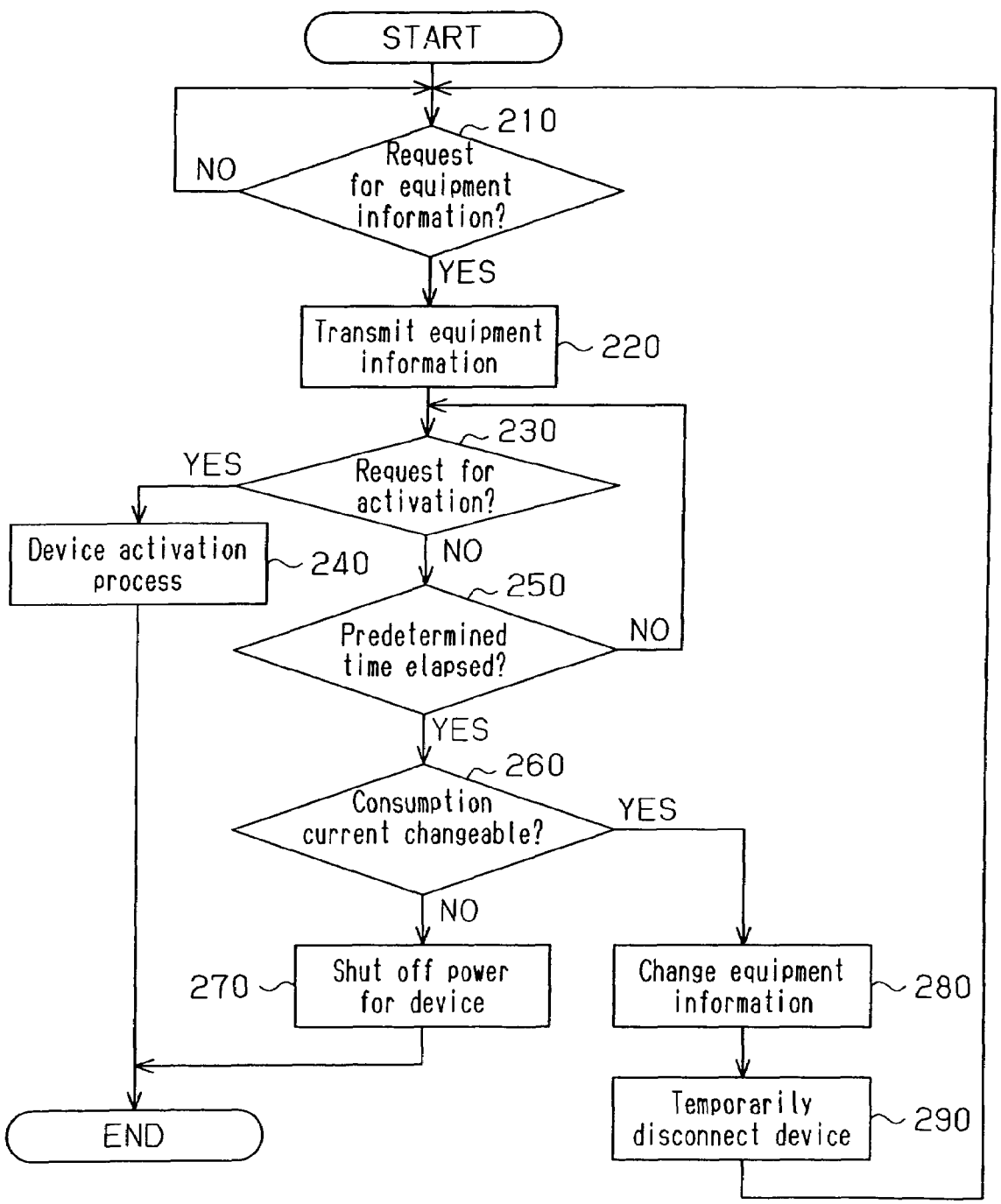
FIG. 11 is a flowchart showing a connection recognition process of the second embodiment.

Of the processes executed by the MPU 33 of the device 31, the process for connection-recognizing the host apparatus 41 will now be described with reference to the flowchart of FIG. 11. The process of FIG. 11 starts when the device 31 is connected to the host apparatus 41.

First, in step 210, the MPU 33 waits until receiving a request command (Get Descriptor) requesting equipment information from the host apparatus 41. The MPU 33, upon receipt of the request command, proceeds to step 220 and transmits the transmitting packet containing the equipment information of the device 31 from the USB controller 35 to the host apparatus 41.

Subsequently, the MPU 33 proceeds to step 230 and determines whether or not the request command (Set Configuration) from the host apparatus 41 is received. When the request command is received, the MPU 33 proceeds to step 240 and ends the present process after performing an activation process on the device 32. If the host apparatus has the capability for supplying the maximum consumption current contained in the equipment information transmitted in step 220, the host apparatus 41 issues the activation request command and supplies the maximum consumption current to the device 31 via the USB cable C1. Therefore, after performing the activation process of the device 31 in step 240, write or read operation of the data is enabled at the requested maximum consumption current.

If the host apparatus 41 does not have the capability of supplying the maximum consumption current of the device 31, the host apparatus 41 does not issue the activation request command. In this case, with the conventional device, connection-recognition is not achieved by the host apparatus 41. Thus, the supply current necessary for operation cannot be acquired. The device 31 of the second embodiment, however, reduces its own consumption current so as to perform the process (process after step 250) for being connection-recognized by the host apparatus 41 when the current supplying capability of the host apparatus 41 is insufficient.

More specifically, in step 250, the MPU 33 determines whether a predetermined time has elapsed from the time the equipment information was transmitted. When the predetermined time has not elapsed, the MPU 33 returns to step 230. When the predetermined time has elapsed, the MPU 33 determines that the host apparatus 41 cannot supply the requested maximum consumption current and proceeds to step 260. The MPU 33 determines whether the maximum consumption current value can be changed or not. When determining that the consumption current value cannot be changed in step 260, the MPU 33 proceeds to step 270, turns off the switch circuit 36b of the power controller 36 to shut off the power for the device 31, and ends the present process.

If determined that the consumption current can be changed in step 260, the MPU 33 proceeds to step 280 and changes the equipment information of the device 31 stored in the register 36a of the power controller 36. The consumption current value contained in the equipment information is reduced to a predetermined value, and the device controller 37 is set to the operation mode (low consumption current mode) corresponding to the reduced current value.

Subsequently, the MPU 33, after turning off each of the switch circuits 42a and 42b of the switch unit 42 for a predetermined time, turns the switch circuits 42a and 42b on in step 290. After having the device 31 in a temporarily disconnected state from the host apparatus 41 through the switching operation of the switch unit 42, the MPU 33 returns to step 210.

When the device 31 is in a temporarily disconnected state due to the process of step 290, the host apparatus 41 determines that the device 31 has been reconnected. The host apparatus 41 then issues a request command requesting the equipment information. The device 31 that has received the request command in step 210 proceeds to step 220 and re-transmits the equipment information. The consumption current value reduced to a smaller current value is re-transmitted in step 280.

The host apparatus 41 does not issue the activation request command when it cannot supply the reduced consumption current. Thus, the processes after step 250 are again performed. The host apparatus 41 issues the activation request command when it can supply the reduced consumption current value. Thus, the MPU 33 proceeds from step 230 to step 240 and ends the present process after performing the activation process for the device 31. The activation process for the device 31 enables the device 31 to perform the write or read operation of the data at the reduced consumption current.

The device 31 of the second embodiment of the present invention has the following advantages.

(1) When the device 31 is connected to the host apparatus 41 and the consumption current of the internal circuits of the device 31 exceeds the supply capability of the host apparatus 41, the host apparatus 41 does not issue the request command requesting activation of the device 31. Thus, the MPU 33 makes a determination to reduce the consumption current of the device 31. When the host apparatus 41 can supply the reduced consumption current, the device 31 is recognized by the host apparatus 41, and the device 31 is operated by the bus-supplied power from the host apparatus 41.

(2) The switch unit 42 for temporarily breaking the connection between the communication port P0 (USB cable C1) and the USB controller 35 is arranged in the device 31. Further, a register 36a for storing the consumption current of the device 31 is arranged in the power controller 36. When the supply capability of the host apparatus 41 is not sufficient, the consumption current of the device 31 in the register 36a is reduced. Then, the switch unit 42 is turned off for a predetermined time. The connection between the communication port P0 and the USB controller 35 is thereby temporarily broken by the switching operation of the switch unit 42 to have the host apparatus 41 recognize that the device has been reconnected. The host apparatus 41 issues a command requesting the equipment information. In response, the device 31 transmits the changed consumption current. In this way, change of consumption current of the device 31 is achieved not by an instruction from the host apparatus 41 but by the operation on the device 31 side.

(3) When the MPU 33 determines that the consumption current of the internal circuits in the device 31 is impossible (during non-recognition of device 31), the power of the device 31 is shut off by the switch circuit 36b of the power controller 36. This prevents the device 31, which is not recognized by the host apparatus 41, from consuming current in an unnecessary manner.

Figure 12:
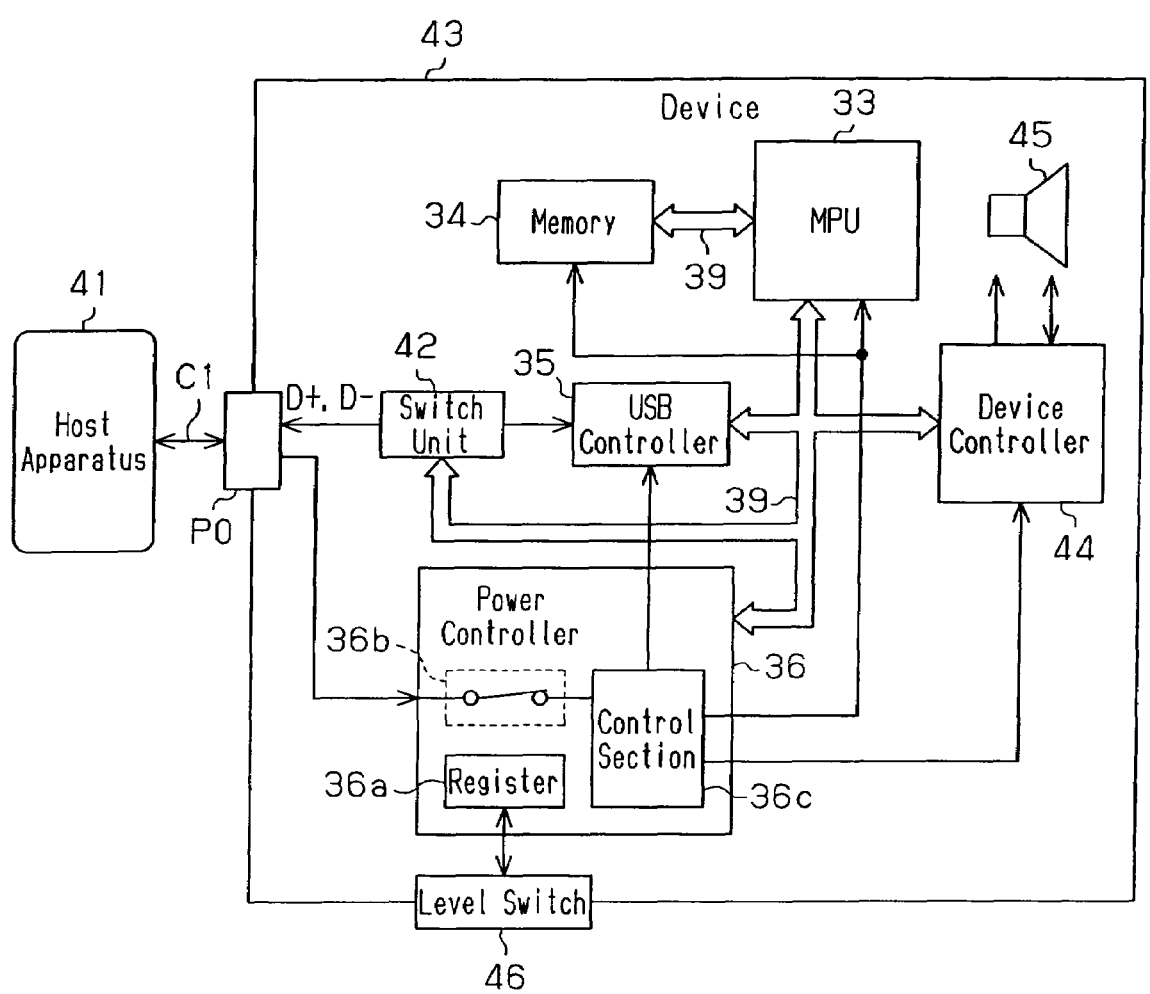
FIG. 12 is a schematic block circuit diagram of a device according to a third embodiment of the present invention.

A third embodiment of the present invention will now be described with reference to the drawings. FIG. 12 is a schematic block circuit diagram showing a device 43 of the third embodiment. In the device 43, the same reference characters are used for elements that are like those in the device 31 of the second embodiment. The following description centers on the difference from the second embodiment.

In the device 43 of the third embodiment, unlike the second embodiment, the device 44 controls a speaker 45. Further, a level switch 46 serving as a setting unit is arranged in the device 43, and a consumption current value calculated from the operation amount (set value) of the level switch 46 is stored in the register 36a of the power controller 36. The device 43 is connected to the host apparatus 41 by a USB cable C1. When the host apparatus 41 requests the equipment information from the device 43, the device 43 requests the consumption current value corresponding to the set value of the level switch 46 from the host apparatus 41.

Figure 13:
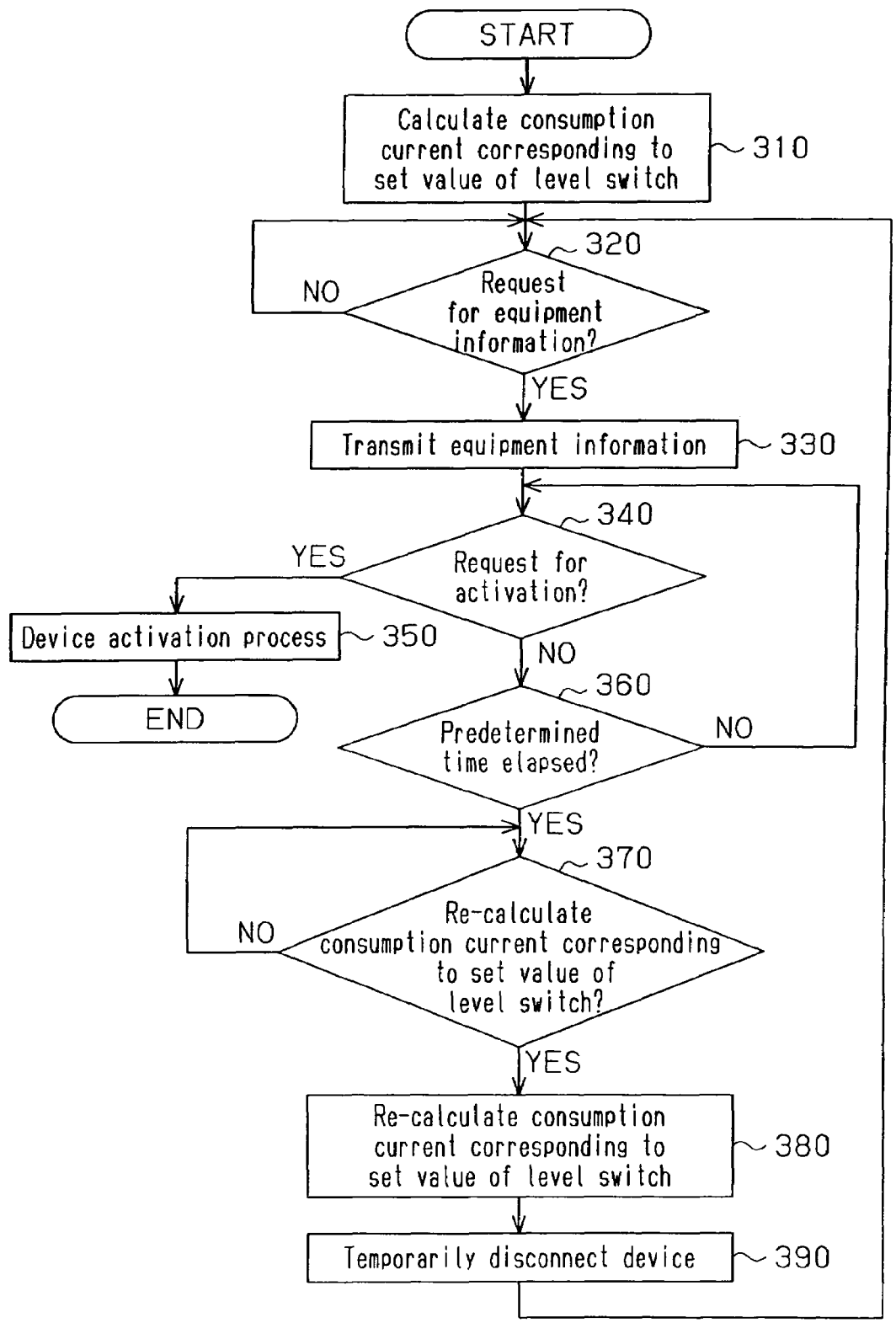
FIG. 13 is a flowchart showing a connection recognition process of the third embodiment.

The process executed by the MPU 33 of the device 43 for connection recognition will now be described with reference to the flowchart of FIG. 13. The process of FIG. 13 is started when the device 43 is connected to the host apparatus 41.

First, in step 310, the MPU 33 calculates the consumption current value corresponding to the set value of the level switch 46 and stores the calculated value as the consumption current value of the equipment information in the register 36a of the power controller 36. Then, the MPU 33 proceeds to step 320 and waits until receiving a request command (Get Descriptor) requesting equipment information from the host apparatus 41. The MPU 33, upon receipt of the request command, proceeds to step 330, and transmits the equipment information for the device 43 to the host apparatus 41.

When the host apparatus 41 can supply the consumption current value contained in the equipment information to the device 43, the activation request command is issued from the host apparatus 41. In this case, the MPU 33 proceeds from step 340 to step 350. After performing the activation process for the device 43, the MPU 33 ends the present process. Thus, the audio output from the speaker 45 is enabled at the consumption current requested by the host apparatus 41.

If the host apparatus 41 cannot supply the consumption current for the device 43, the host apparatus 41 does not issue the activation request command. In this case, the MPU 33 repeatedly executes the processes of step 340 and step 360 until a predetermined time has elapsed from the time the equipment information is transmitted. After a predetermined time has elapsed, the MPU 33 proceeds to step 370.

The MPU 33 determines whether the level switch 46 has been operated and the set value has changed in step 370. If the set value of the level switch 46 has been changed, the MPU 33 proceeds to step 380 to re-calculate the consumption current value corresponding to the set value of the level switch 46 and stores the calculated value in the register 36a of the power controller 36.

Subsequently, the MPU 33 turns off the switch unit 42 for a predetermined time and then turns it on to have the device 43 in a state temporarily disconnected from the host apparatus 41 in step 390 and then returns to step 320.

When the device 43 is in a temporarily disconnected state due to the process of step 390, the host apparatus 41 determines that the device 31 has been reconnected. The host apparatus 41 then issues the request command requesting for the equipment information. The device 43 that has received the request command in step 320 re-transmits the equipment information in step 330. The consumption current value corresponding to the changed set value of the level switch 46 is re-transmitted.

The host apparatus 41 does not issue the activation request command when it cannot supply the changed consumption current value. Thus, the processes after step 360 are again performed. The host apparatus 41 issues the activation request command when it can supply the changed consumption current. Thus, the MPU 33 proceeds from step 340 to step 350 and ends the present process after performing the activation process. The device 43 is then able to perform the audio output from the speaker 45 at the changed consumption current through the activation process of the device 43.

The device 43 of the third embodiment of the present invention has the advantages described below.

(1) When the consumption current of the device 43 exceeds the supply capability of the host apparatus 41 and the host apparatus 41 does not recognize the device 43, if the set value of the level switch 46 is changed, the consumption current that is in accordance with such set value is calculated and stored in the register 36a of the power controller 36. Then, the device 43 is recognized as being reconnected by the host apparatus 41 through the switching operation of the switch unit 42. In response to the request command issued from the host apparatus 41, the device 43 notifies the changed consumption current to the host apparatus 41. When the host apparatus 41 is able to supply the changed consumption current, the device 43 is recognized by the host apparatus 41, and the device 43 is operated by the bus-supplied power from the host apparatus 41.

(2) When notification of the consumption current corresponding to the set value of the level switch 46 is provided to the host apparatus 41 and the consumption current is supplied from the host apparatus 41, the device 43 is operated with an appropriate supply current corresponding to the set value of the level switch 46.

A fourth embodiment of the present invention will now be described.

In the fourth embodiment, the configuration of the device 31 is similar to the second embodiment shown in FIG. 9. Further, when determining that the consumption current of the device cannot be supplied during connection recognition, the host apparatus 41 of the fourth embodiment notifies the device 31 of the suppliable current. The device 31 reduces the consumption current in accordance with the supply current of the host apparatus 41 to have the host apparatus recognize the device 31.

Figure 14:
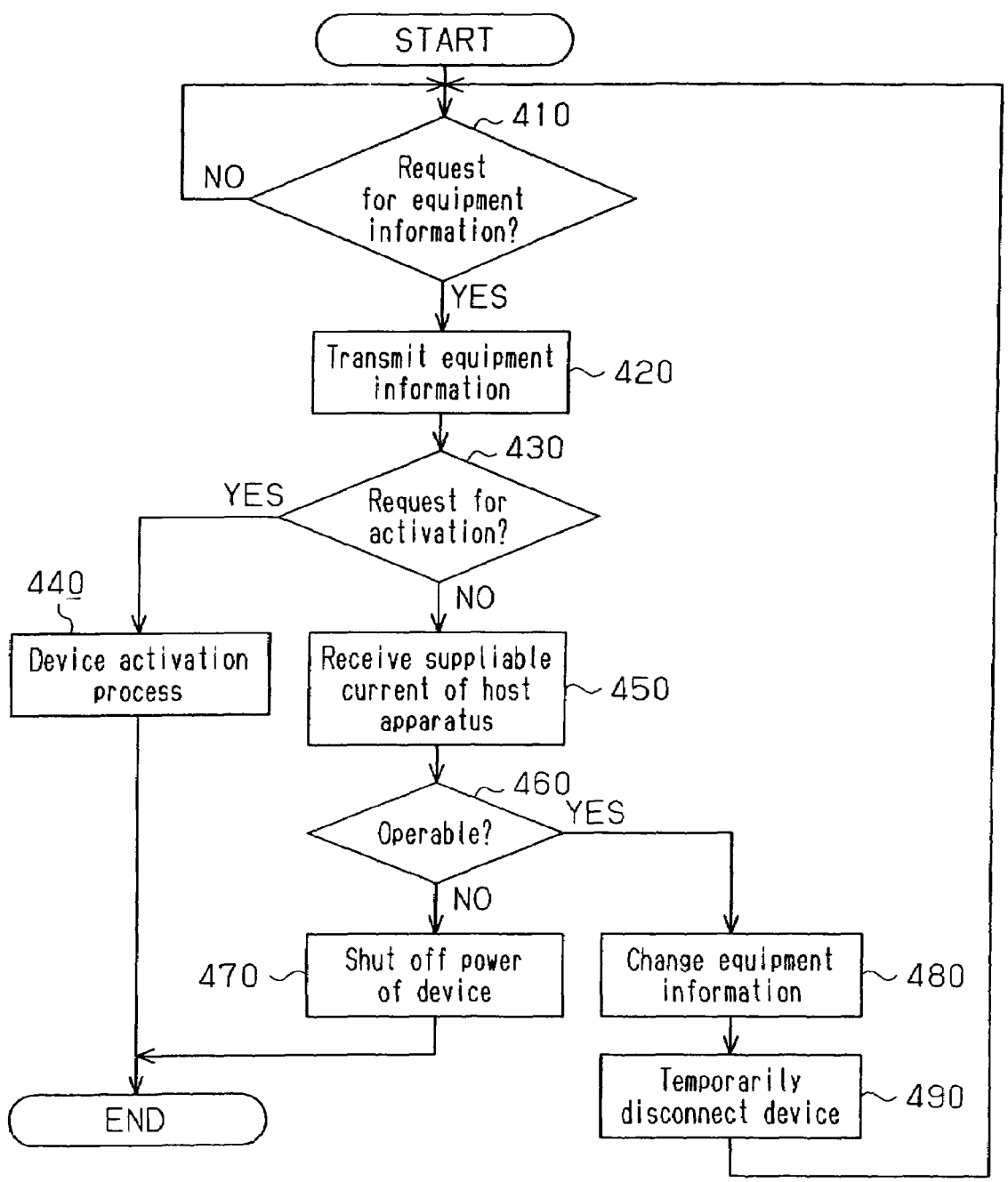
FIG. 14 is a flowchart showing a connection recognition process according to a fourth embodiment of the present invention.

FIG. 14 is a flowchart describing the process of connection recognition of the device 31 in the fourth embodiment. In FIG. 14, steps 410 to 440, and 470 to 490 are identical to steps 210 to 240 and 270 to 290 of the second embodiment, and steps 450 and 460 differ from the second embodiment. The following description centers on the difference from the second embodiment.

That is, when the consumption current value of the device 31 transmitted in step 420 exceeds the capability (suppliable current value) of the host apparatus 41, the host apparatus 41 notifies the device 31 of the suppliable current amount without issuing the request command for requesting activation of the device 31. In this case, the MPU 33 of the device 31 receives the suppliable current value of the host apparatus 41 in step 450. The MPU 33 proceeds to step 460, and determines whether the device 31 is operable at the suppliable current value of the host apparatus 41.

When determining that the device 31 is inoperable in step 460, the MPU 33 proceeds to step 470 and turns off the switch circuit 36b of the power controller 36. This shuts off the power of the device 31 and ends the present process.

When determining that the device 31 is operable in step 460, the MPU 33 proceeds to step 480 and changes the equipment information of the device 31 stored in the register 36a of the power controller 36. The consumption current value contained in the equipment information is changed to a value that is the same as the suppliable current value of the host apparatus 41. Further, the MPU 33 sets the operation mode of the device controller 37 to the low consumption current mode that corresponds to the changed current value.

Subsequently, the MPU 33 turns off the switch unit 42 for a predetermined time and then turns it on in step 490 to temporarily disconnect the device 31 from the host apparatus 41. Then, the MPU 33 returns to step 410.

When the device 31 is in a temporarily disconnected state due to the process of step 490, the host apparatus 41 determines that the device 31 has been reconnected and thus issues the request command for requesting the equipment information. When receiving the request command in step 410, the MPU 33 moves to step 420 to re-transmit the equipment information (consumption current value) which has been changed in step 480. Since the suppliable current value of the host apparatus 41 is transmitted, the host apparatus 41 determines that it can supply the consumption current of the device 31 and issues the activation request command. Therefore, the MPU 33 proceeds to step 440 and ends the present process after performing the activation process on the device 31. This enables the device 31 to perform the write or the read operation of data at the reduced consumption current (current available by the host apparatus 41) by the activation process of the device 31.

The device 31 of the fourth embodiment of the present invention has the advantages described below.

(1) When the consumption current of the device 31 exceeds the suppliable capability of the host apparatus 41, the consumption current of the device 31 is reduced in accordance with the capability of the host apparatus 41. In this way, the performance (write or read speed) of the device is maximized at the suppliable current of the host apparatus 41.

Figure 15:
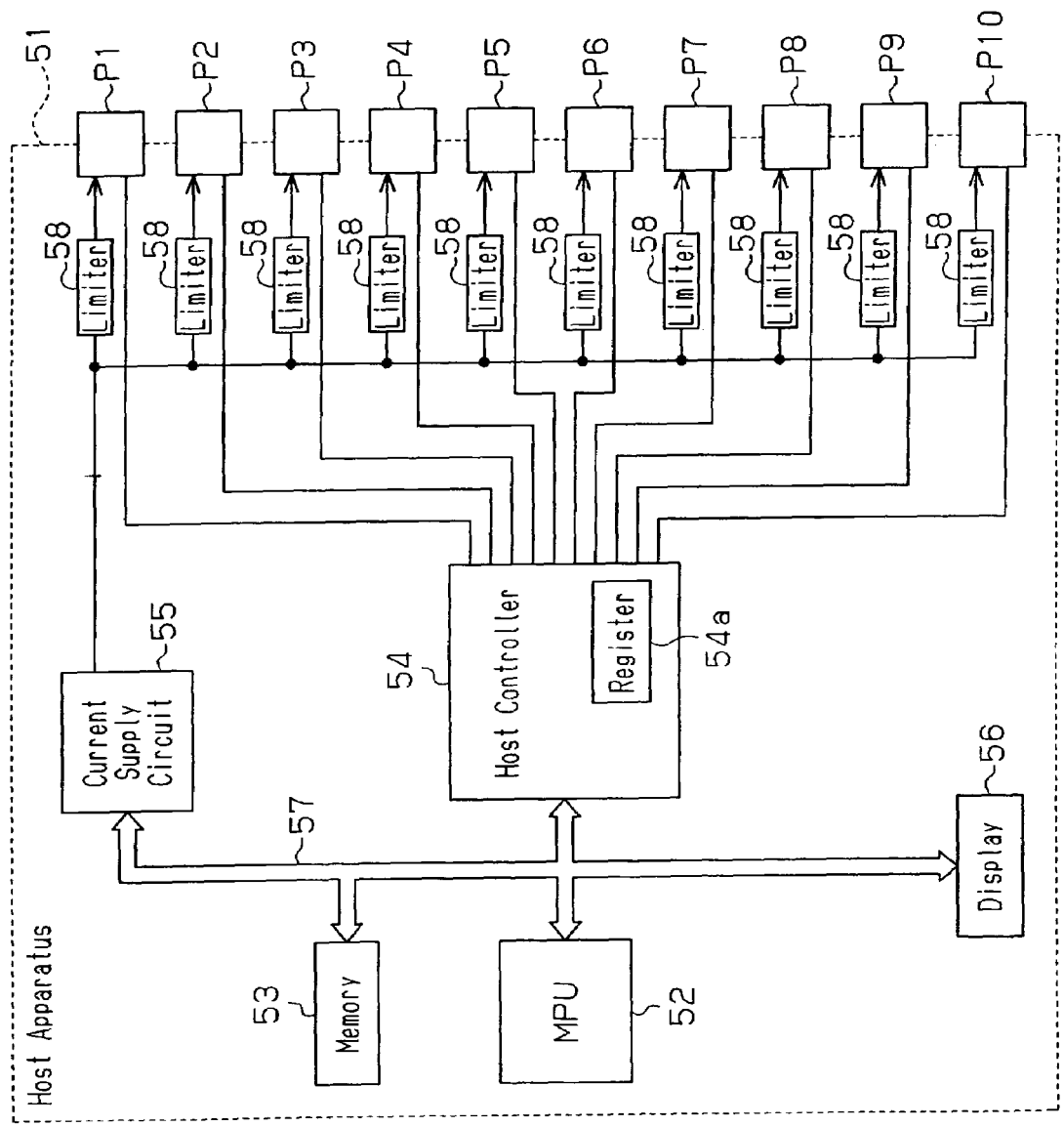
FIG. 15 is a schematic block circuit diagram of a host apparatus according to a fifth embodiment of the present invention.

A fifth embodiment of the present invention will now be described with reference to the drawings. FIG. 15 is a schematic block circuit diagram showing a host apparatus 51 of the fifth embodiment.

The host apparatus (more specifically, personal computer) 51 includes an MPU 52, a memory 53, a host controller 54, a current supply circuit 55, and a display 56. In the host apparatus 51, the MPU 52, the memory 53, the host controller 54, the current supply circuit 55, and the display 56 are connected by an internal bus 57 to transmit and receive data with one another. First to tenth communication ports P1 to P10, to which the USB devices are connected, are arranged in the host apparatus 51.

The MPU 52 serving as a control circuit executes various processes in accordance with programs stored in the memory 53 and controls the entire host apparatus 51. The programs stored in the memory 53 include a communication program, which controls the host controller 54 and the current supply circuit 55, and a display program, which displays the equipment information of each device connected to each communication port P1 to P10 on the display 56 in a GUI (Graphic User Interface) format.

The host controller 54 is a communication circuit complying with the USB standard and controls communication with devices connected to each communication port P1 to P10. A register 54a is arranged in the host controller 54 and the equipment information of devices connected to the communication ports P1 to P10 are stored in the register 54a. More specifically, when a device is connected to any one of the communication port P1 to P10, the host apparatus 51 performs negotiation with the device to recognize the connection and stores the equipment information obtained therefrom in the register 54a.

The current supply circuit 55 supplies the maximum consumption current contained in the equipment information of the register 54a to the device connected to the communication port. Further, a limiter 58 is arranged in a current path connecting the current supply circuit 55 and each communication port P1 to P10. The limiter 58 is a current monitoring circuit including a switch circuit that is inactivated to break the current path when over current that is greater than or equal to a predetermined current flows.

The MPU 52 executes an application program (program for display) to read the equipment information stored in the register 54a of the host controller 54 and show a status window on the display 56, which serves as the display device.

More specifically, as shown in FIG. 16, when a plurality of devices 61 to 67 are connected to the host apparatus 51, the status window W1 of FIG. 17 is shown on the display 56. A keyboard 61 with a mouse is connected to the first communication port P1 in the host apparatus 51, a printer 62 is connected to the second communication port P2, and a hard disk 63 is connected to the third communication port P3. Further, an optical disc 64 is connected to the fourth communication port P4, and a scanner 65 is connected to the fifth communication port P5. Moreover, digital still cameras (DSC) 66 and 67 are connected to the eighth communication port P8 and the ninth communication port P9. The keyboard 61, the printer 62, the hard disk 63, the optical disc 64, the scanner 65, and the DSCs 66 and 67 are USB devices incorporating a USB function (USB communication function) and are each connected to a communication port of the host apparatus 51 by a USB cable C1.

In the fifth embodiment, the printer 62 is a device that is operated not by the bus-supplied power of the USB but by the power supplied from a separate power cable (not shown). Other devices are bus-powered devices operated by the bus-supplied power of the USB.

Referring to FIG. 17, the status window W1 displayed on the display 56 has columns for items including the selector, the port number (Port No.), the device name, the manufacturer, the consumption current (mA), and the state. The device name, the manufacturer, and the consumption current are displayed for every communication port based on the equipment information stored in the register 54a of the host controller 54. Further, the column of the consumption current indicates the consumption current value (requested value) of the device requested from the host apparatus 51 and the current value (present value) presently supplied from the host apparatus 51 via the USB cable C1.

The requested values of the device at each port are, 100 mA for the keyboard 61, 100 mA for the printer 62, 500 mA for the hard disk 63, 500 mA for the optical disc 64, 300 mA for the scanner 65, 200 mA for the DSC 66, and 250 mA for the DSC 67.

In the selector column, a selection button for switching the device connected to each communication port to either the ON state or the OFF state (used state or unused state) is arranged. In the communication port P1 to P5, P8, and P9 to which the devices 61 to 67 are connected, the button of either ON or OFF is selected. The ON button is selected for the first to the fourth communication ports P1 to P4 and the ninth communication port P9, and the OFF button is selected for the fifth communication port P5 and the eighth port P8.

When the ON buttons of the communication ports P1 to P4, P9 are selected, the consumption current requested by the devices 61 to 67 is supplied from the current supply circuit 55, and the USB function in the relevant devices is activated. Thus, the state column is "active". However, since the printer 62 is operated not by the bus-supplied power but by its own power source, the "active" state is indicated in blue, whereas the "active" state is indicated in red for the other devices since they are operated by the bus-supplied power. The consumption current column indicates the present value, which is the current value that is the same as the requested value.

If the OFF buttons of the communication ports P5 and P8 are selected, the consumption current requested by the devices 65 and 66 is not supplied from the current supply circuit 55. Thus, the USB function of the devices 65 and 66 is suspended (inactivated). In this state, "suspend" is shown in the state column, and 2.5 mA is shown as the present value of the consumption current.

Further, for the communication ports P6, P7, and P10, which are not used, 0 mA is indicated as the requested value and the present value of the consumption current, and "Not use" is indicated in the state column.

Moreover, a display column indicating the requested consumption current, the used current, the tolerable current, and the margin current for all the ports is located below the status window W1. The requested consumption current is the current of the sum of the requested value of all the communication ports, and the used current is the sum of the present current values of all the ports. Further, the tolerable current is the maximum current that can be output by the current supply circuit 55, and the margin current is the current obtained by subtracting the used current from the tolerable current.

In the above specific examples, the requested consumption current is 1950 mA, and the used current is 1455 mA. Further, the tolerable current is 2500 mA and the margin current is 1045 mA. Therefore, if the ON buttons of the fifth communication port P5 and the eighth communication P8 are selected and the current of the requested value is supplied to the scanner 65 and the DSC 66 connected to the respective communication port P5 and P8, the tolerable current of 2500 mA is not exceeded since the used current is 1950 mA. In this case, the scanner 65 and the DSC 66 are properly operated.

If a device having the maximum consumption current of 500 mA is connected to the unused communication ports P6, P7, P10 of the host apparatus 51, the tolerable current of the host apparatus 51 is exceeded. In this case, in addition to the operation of the newly connected device, the operation of the connected devices becomes unstable.

Thus, in the fifth embodiment, as shown in FIG. 18, when new devices (hard disk 71, 72, hub 73) are connected to the communication ports P6, P7, and P10 of the host apparatus, each device will not immediately be in the operable state and the bus-supplied power of 100 mA is first permitted to flow so as to enable only the transfer of information. The host apparatus 51 shows the status window W2 of FIG. 19 based on the equipment information obtained by the transfer of information.

That is, with respect to the communication ports P6, P7, P10, the device name, the manufacturer, the consumption current, and the state are displayed. The requested values of the hard disks 71, 72, and the hub 73, which are newly connected to the communication ports P6, P7, and P10, are 500 mA, and the present values are 100 mA. In the selector column of each communication port P6, P7, and P10, neither the ON button nor the OFF button is selected, and the USB function is in a waiting state. Thus, "Wait" is indicated in the state column.

Further, in the status window W2, the requested consumption current is 3450 mA, the used current is 1755 mA, the tolerable current is 2500 mA, and the margin current is 745 mA.

The user operating the host apparatus 51 is required to determine whether or not each device will be used with the status window W2 shown on the display 56. The user operates the mouse of the keyboard 61 while paying attention to the tolerable current displayed on the status window W2. After selecting the OFF buttons for the optical disc 64 and the DSC 67 that will not be immediately used, the user selects the ON buttons for the newly connected hard disks 71, 72 and the hub 73.

As a result, the status window W3 is displayed on the display 56, as shown in FIG. 20. In the status window W3, compared to the status window W2 of FIG. 19, for the fourth communication port P4 (optical disc 64) and the ninth communication port P9 (DSC 67), the present values are changed to 2.5 mA and the indicated states are "suspend". Further, for the seventh communication port P7 (hard disk 72), the present values of the sixth communication port P6 (hard disk 71) and the tenth communication port P10 (Hub 73) are changed to 500 mA and the indicated states are changed to "active". Since the hub 73 is equipment that is operated not by the bus-supplied power but by its own power source, the "active" state is indicated in blue.

In this case, the used current becomes 2210 mA and a margin current of 290 mA is obtained with respect to the tolerable current of 2500 mA. Thus, the host apparatus 51 is able to connection-recognize the new devices (hard disk 71, 72, and hub 73) and properly operate each device 71 to 73.

Figure 21:
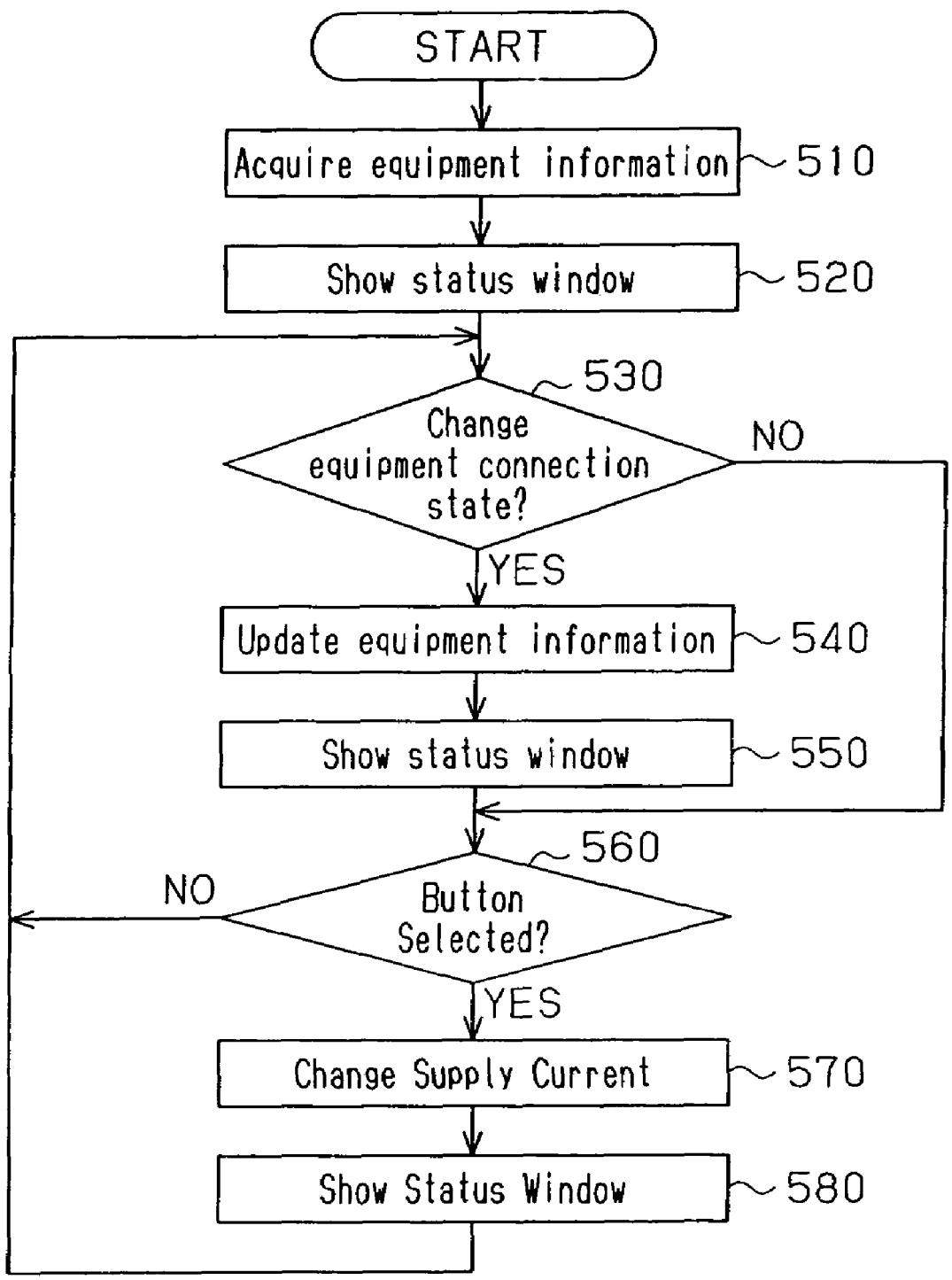
FIG. 21 is a flowchart showing the process for displaying the status window.

Of the processes executed by the MPU 52 of the fifth embodiment, the process for displaying the status windows W1 to W3 will now be described with reference to the flowchart of FIG. 21. The process of FIG. 21 starts after an initialization process performed when the host apparatus 51 is activated.

First, in step 510, the MPU 52, after acquiring the equipment information of each device from the register 54a of the host controller 54, proceeds to step 520 and displays the status window W1 (refer to FIG. 17), which corresponds to the equipment information, on the display 56. In step 530, the MPU 52 determines whether there is a change in the equipment connection state, such as a new device being connected to an unused communication port and a connected device being disconnected from a connection port. When determining that there is change, the MPU 52 proceeds to step 540 and updates the equipment information of the register 54a in the host controller 54. For example, when a new device is connected to a predetermined communication port, a request command is issued from the host controller 54 to the new device. The equipment information returned from the device in response to the request command is stored in the register 54a. When a connected device is disconnected from a predetermined communication port, the equipment information relating to that device is deleted from the register 54a.

In step 550, the MPU 52 shows the status window based on the updated equipment information. In the following step 560, the MPU 52 determines whether or not a button in the select column shown in the status window has been selected by the user through a mouse operation. If a button has not been selected, the MPU 52 returns to the process of step 530. Further, when determining that there is no change in the equipment connection state in step 530, the MPU 52 proceeds to step 560 without performing the processes of step 540 and 550.

Therefore, when the user does not connect a new device to the host apparatus 51 and does not select a button in the selector column of the status window W1, the processes of step 530 and step 560 are repeated. Thus, the status window W1 shown in step 520 is continuously shown on the display 56.

Further, as shown in FIG. 18, when the user sequentially connects the hard disks 71, 72, and the hub 73 to the respective communication port P6, P7 and P10, the process of steps 530 to 560 are repeated three times. As a result, the status window W2 of FIG. 19 is shown on the display 56.

When the user selects a button in the select column of the status window W2, the MPU 52 proceeds to step 570 from step 560 to change the current supplied from the current supply circuit 55 for the selected communication port. Subsequently, the MPU 52 proceeds to step 580 and, after displaying the status window corresponding to the button selection of the user on the display 56, returns to the process of step 530. In step 580, the state column is changed in accordance with the button selection and the consumption current is calculated (calculation of used current and margin current).

More specifically, in the status window W2, after the OFF buttons for the fourth communication port P4 and the ninth communication port P9 are selected, the ON buttons for the sixth communication port P6, the seventh communication port P7, and the tenth communication port P10 are sequentially selected. In this case, the processes of step 560 to step 580 are repeated for every button selection. As a result, the status window W3 of FIG. 20 is shown on the display 56.

Although not shown in the drawings, when over current greater than the maximum consumption current of each device flows causing the flow limiter 58 to function, a message indicating the flow of over current is shown on the status window W1 to W3 to warn the user. More specifically, "Warning" is shown in the state column of the status windows W1 to W3 so as to give off an alarm. Alternatively, the present value of the over current is indicated with a color differing from that of a normal value.

When the USB device is connected to the hub 73, which is connected to the tenth communication port P10 of the host apparatus 51, the status window of the hub 73 may be shown.

Figure 22:
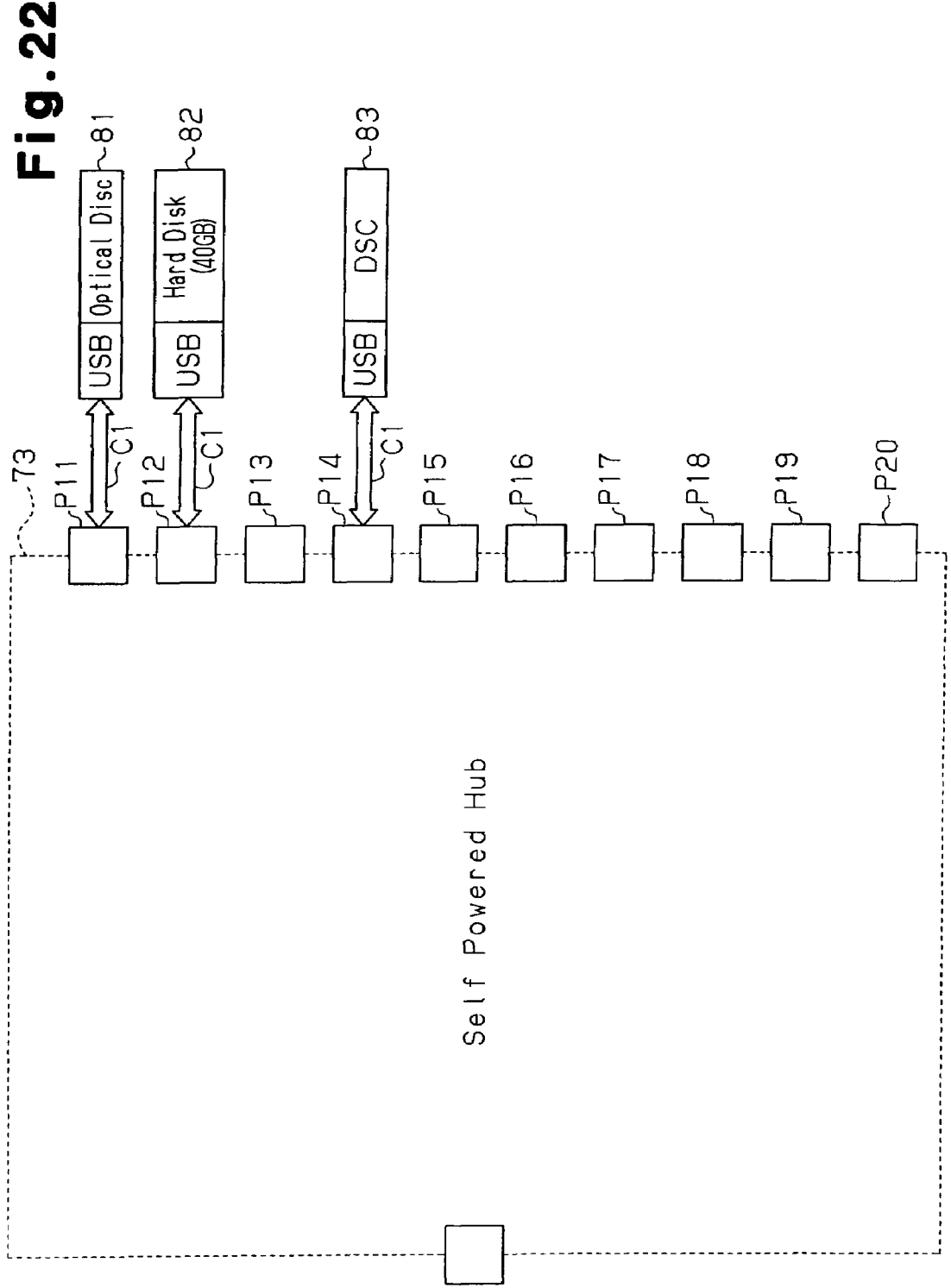
FIG. 22 is an explanatory diagram showing the connection state of each device in the hub.

More specifically, as shown in FIG. 22, when a plurality of devices 81 to 83 are connected to the hub 73, which serves as a relay device, the status window W11 of FIG. 23 is shown on the display 56 of the host apparatus 51. That is, the hub 73 has first to tenth communication ports P11 to P20 for connection to USB devices. The optical disc 81 is connected to the first communication port P11, the hard disk 82 to the second communication port P12, and the DSC 83 to the fourth communication port P4.

Further, in the status window W11 of FIG. 23, the ON button is selected for the first and the second communication ports P11 and P12, and the OFF button is selected for the fourth communication port. Therefore, the respective requested current value (=100 mA) is supplied from the current supply circuit (a power IC that is not shown in the drawings) to the optical disc 81 and the hard disk 82.

The hub 73 is equipment that operates with its own power source (self-powered hub), and the current (tolerable current) that can be output from the current supply circuit is 5000 mA. That is, the hub 73 is able to supply current of a maximum of 500 mA as specified by the USB standard to each of the communication ports P11 to P20. Thus, the supply current to each device does not need to be controlled in the hub 73, and the status window W11 notifies the user of the used or unused state of each device connected to the hub 73.

Figure 24:
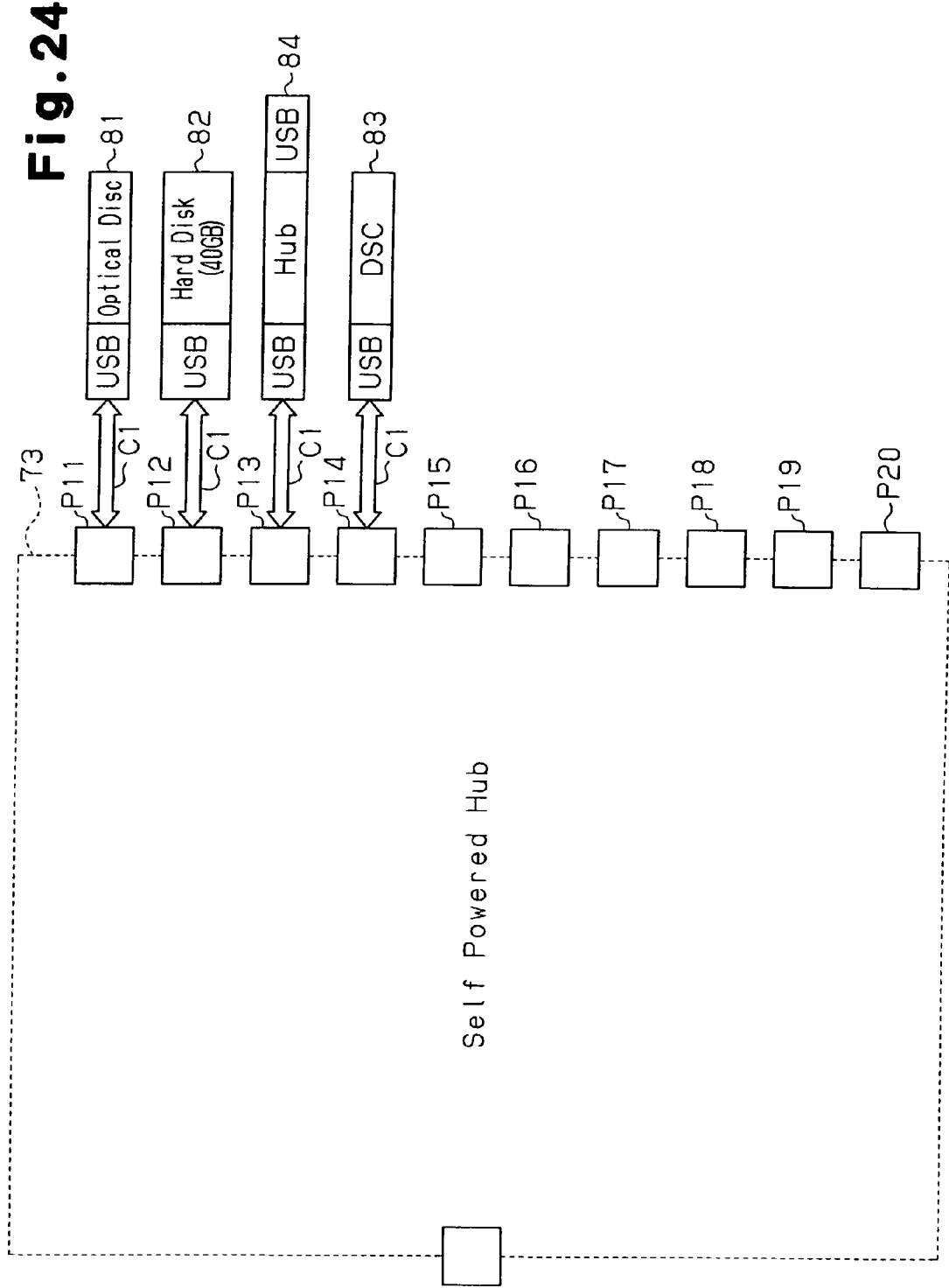
FIG. 24 is an explanatory diagram showing the connection state of each device in the hub.

Further, as shown in FIG. 24, the hub 84 may be connected to the communication port P13 of the hub 73. In this case, in addition to the status window W12 of the hub 73 shown in FIG. 25, the status window (not shown) of the hub 84 is shown on the display 56 of the host apparatus 51. When displaying a plurality of status windows, each window is displayed in a pop-up style or in a scroll style.

Figure 26:
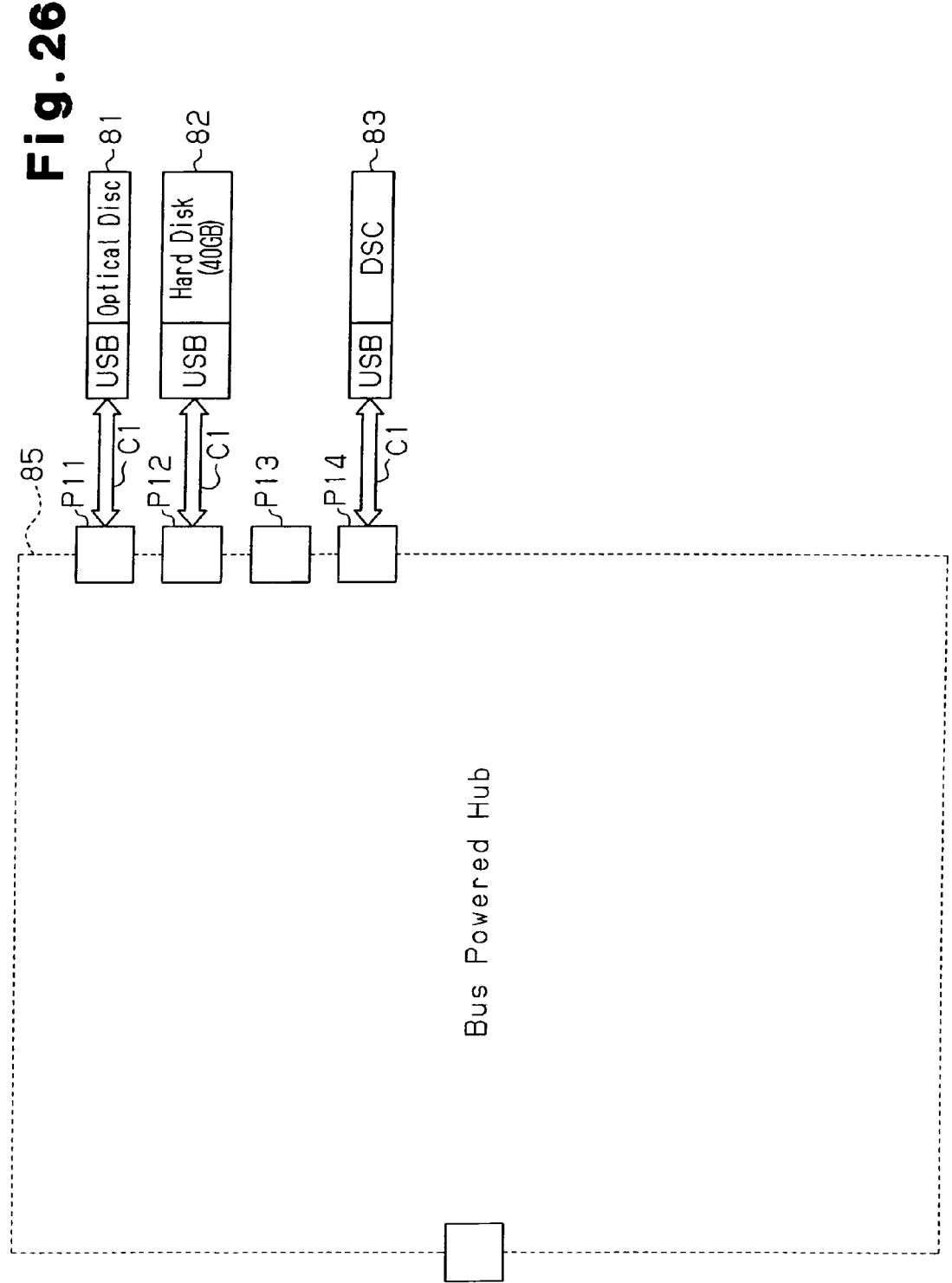
FIG. 26 is an explanatory diagram showing the connection state of each device in the hub.
Figures 27, 28:
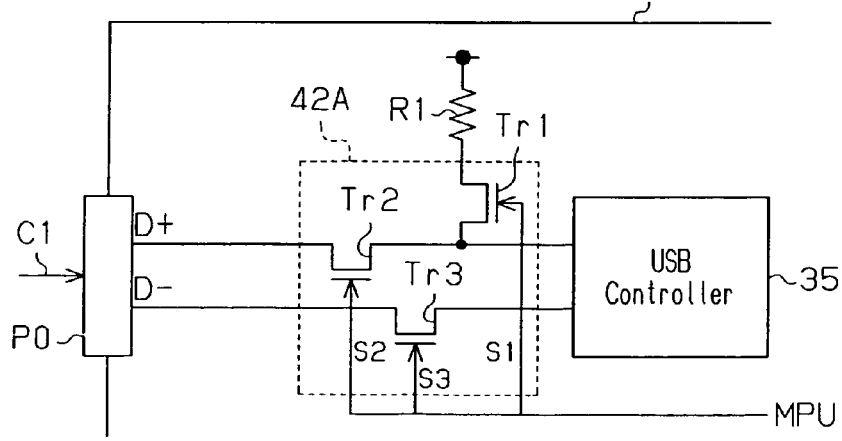
FIG. 27 is an explanatory diagram showing the status window of the hub.
FIG. 28 is a circuit diagram showing another example of the switch unit.

The hub that is operated by bus-supplied power may be connected to any one of the communication ports of the host apparatus 51. FIG. 26 shows a hub (bus-powered hub) that is operated by bus-supplied power. In the hub 85, the optical disc 81 is connected to the first communication port P11, the hard disk 82 to the second communication port P12, and the DSC 83 to the fourth communication port P4. As shown in FIG. 27, the status window W13 of the hub 85 is shown on the display 56 of the host apparatus 51. In this case, the tolerable current of the hub 85 is 400 mA and small. Thus, the window W13 enables the user to select the necessary devices without exceeding the tolerable current.

The host apparatus 51 of the fifth embodiment of the present invention has the advantages described below.

(1) The status windows W1 to W3 indicating the equipment information for devices 61 to 67 and 71 to 73 connected to each communication port P1 to P10 are shown on the display 56 of the host apparatus 51. In addition to the equipment information (device name, manufacturer, consumption current) acquired from each device 61 to 67 and 71 to 73, the selection buttons (ON button and OFF button) enabling the user to select a used state or unused state for each device is shown in the status window W1 to W3. When the user checks the status window W1 to W3 and selects a button, the supply current to each device is controlled based on the selected result. In this way, the used state of each device at that point of time may be checked with the status window W1 to W3.

In the prior art, when increasing the number of ports of the communication port in the host apparatus, the current supply capability of the current supply circuit must be raised as the communication ports increase. This enlarges the circuit scale. In the fifth embodiment, however, management of the supply current to each of the devices 61 to 63 and 71 to 73 is enabled in accordance with the current supply capability of the current supply circuit 55. Thus, more ports may be installed without enlarging the circuit scale.

(2) The display screen (screen of status windows W1 to W3 and W11 to W13) of the display 56 is shown in the GUI format. This enables easy selection of selection buttons shown in each of the status windows W1 to W3 and W1 to W13 through a mouse operation.

(3) The tolerable current of which the host apparatus 51 is capable of supplying, the used current supplied from the host apparatus 51 to the devices 61 to 63 and 71 to 73, and the margin current obtained by subtracting the used current from the tolerable current are shown in the status windows W1 to W3. In this case, the user selects the OFF buttons of unnecessary devices and selects the ON buttons of the necessary devices while checking the margin current so as not to exceed the capability of the host apparatus 51.

(4) The status windows W11 to W13 of the hubs 73 and 85 connected to the communication port P10 of the host apparatus 51 are displayed separately from the status windows W1 to W3 of the host apparatus 51. In this case, the status windows W11 to W13 of the hubs 73 and 85 are checked by the user, and the management of the supply current of each device 81 to 84 connected to the hubs 73, 85 is appropriately performed.

(5) In the host apparatus 51, the limiter 58 is arranged in the current path connecting the current supply circuit 55 and each communication port P1 to P10. Thus, the system operation is prevented from being unstable.

A sixth embodiment of the present invention will now be described.

Figure 29:
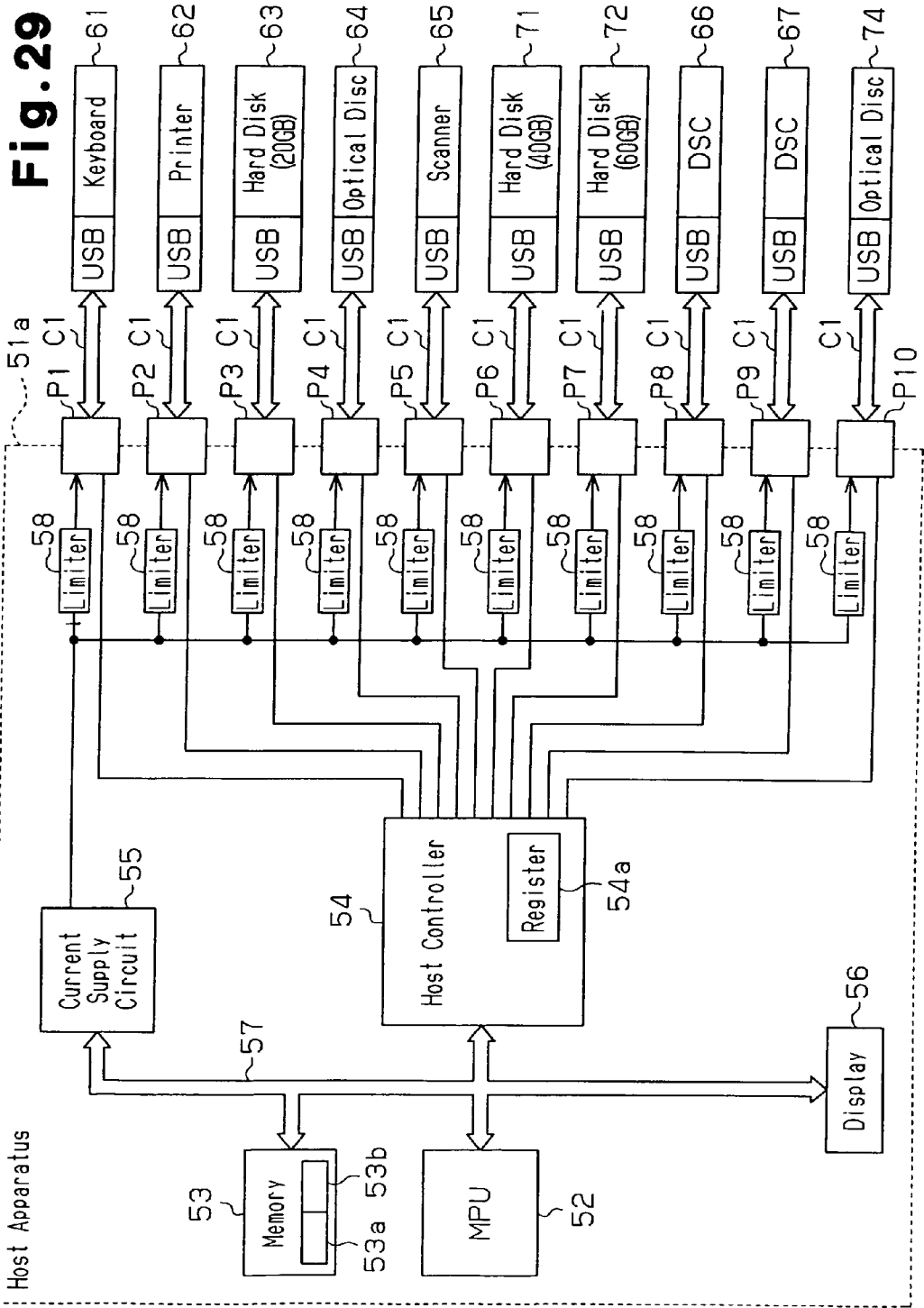
FIG. 29 is a schematic block circuit diagram of a host apparatus according to a sixth embodiment of the present invention.

FIG. 29 is a schematic block circuit diagram showing a host apparatus 51*a* of the sixth embodiment.

In the sixth embodiment, the configuration of the host apparatus 51*a* is the same as the host apparatus 51 of the fifth embodiment shown in FIG. 15. As shown in FIG. 29, the host apparatus 51*a* includes a plurality of communication ports P1 to P10, and USB devices D1 to D10 are respectively connected to the communication ports P1 to P10.

The devices D1 to D9 are substantially the same devices as those of devices 61 to 65, 71, 72, 66, and 67 of the fifth embodiment and have the same electrical properties (USB function, requested value). The device D10 is an optical disc and the requested value is 500 mA. The device (e.g., device D1) or the device name (e.g., keyboard D1) will be used in the following description.

The MPU 52 serving as the control circuit executes various processes in accordance with programs stored in the memory 53 and controls the entire host apparatus 51*a*. The program stored in the memory 53 includes a communication program, a display program, a current control program, and an application program. The communication program is a program for controlling the host controller 54 and the current supply circuit 55. The display program is a program for displaying the equipment information of each device D1 to D10 connected to each communication port P1 to P10 in a GUI (Graphic User Interface) format. The current control program is a program for controlling the current supplied to the devices D1 to D10 connected to each communication port P1 to P10.

The application program is a program for performing spreadsheet calculations, word processing, image processing, or the like. The MPU 53 may use the above devices when executing the application program. For instance, when executing a spreadsheet application program, the MPU 53 reads data for calculation from the hard disk D3 (D6, D7) and prints out the data with a printer D2.

When using one of the USB devices D1 to D10 connected to the communication port P1 to P10 during execution of an application program and the like, the MPU 52 changes the operation state of that device. The MPU 52 changes the operation state of the device that is to be used if it is in an inactive state.

Devices provided with the USB function may be a bus-powered device or a self-powered device. In a bus-powered device, the USB function and the device main body are activated by current supplied via the USB cable C1. In the self-powered device, the device main body is operated by an external power source and the USB function is activated by current supplied via the USB cable or by the current supplied via the USB cable and the external power source. Further, a device in an inactive state is supplied with current (2.5 mA in the fifth embodiment) that allows minimum communication (device re-set or reception of data signal) with the host apparatus 51*a* with respect to the USB function. A device in an active state is supplied with current (requested current) that allows all the operations of the device in accordance with the communication speed. Therefore, the MPU 52 activates the USB function of the device that is to be used, that is, changes the state of the status window to "active" and supplies the requested current.

When the total consumption current value of all the connected devices exceeds the tolerable current value of the host apparatus 51*a* by the activation of the devices, the MPU 52 must inactivate some of the active devices so that the total consumption current value does not exceed the tolerable current value.

Thus, the MPU 52 shows the status window on the display 56 to have the user operating the host apparatus 51*a* decide whether or not to use each device. The user operates the mouse of the keyboard 61 while paying attention to the tolerable current indicated in the status window and selects the OFF button of the device that is not presently being used.

The MPU 52, after suspending (inactivating) the USB function of the device for which the OFF button has been selected by the user, operates (activate) the USB function of the device that is to be used. The MPU 52 then shows the status window including the changed operation state on the display 56.

As a result, when using an inactive device through a program, such as an application, it is only necessary to select the device that is to be inactivated. In other words, if the inactive device is not selected, the inactive device is activated as a device that is to be used. Thus, the user does not have to check whether the device that is to be used in the program is active or inactive and does not have to change an inactive device to an active state. Thus, there is no burden for activating the device.

When changing the operation states of the connected devices D1 to D10, the MPU 52 saves the status window from the display 56. The status window includes columns for the items of the selector, the port number (Port No.), the device name, the manufacturer, the consumption current (mA), and the state. The display information (equipment information, state of equipment and the like) for each column is stored in a first region 53*a* of the memory 53. The MPU 52 shows the display information (equipment information, state of equipment etc.) stored in the first region 53*a* in each column of the status window. Therefore, saving the status window refers to saving the display information corresponding to each column, and the MPU 52 has the information (i.e., various information stored in the first region 53*a*) of the status window transferred to a second region 53*b* of the memory 53.

The saving of the status window is performed to prevent setting defects. With a plurality of devices connected to the host apparatus 51, when the total requested value of the devices exceeds the tolerable current value of the host apparatus 51*a*, some of the selected devices are activated and the other devices are inactivated. Thus, when a device used to execute the application program is inactive, that device must be activated. However, if a used device remains active, the present setting of that device may differ from the user's desirable setting and thus may cause a deficiency. For instance, when activating the device that is to be used, if the total current consumption value of the devices exceeds the tolerable current value of the host apparatus 51*a*, an active device must be inactivated to reduce the used current. Thus, when such a device is inactivated although it is to be used next, the device cannot be used since its setting may have been changed. Further, the user must display the status window to change the operation state. This is troublesome.

Figure 30:
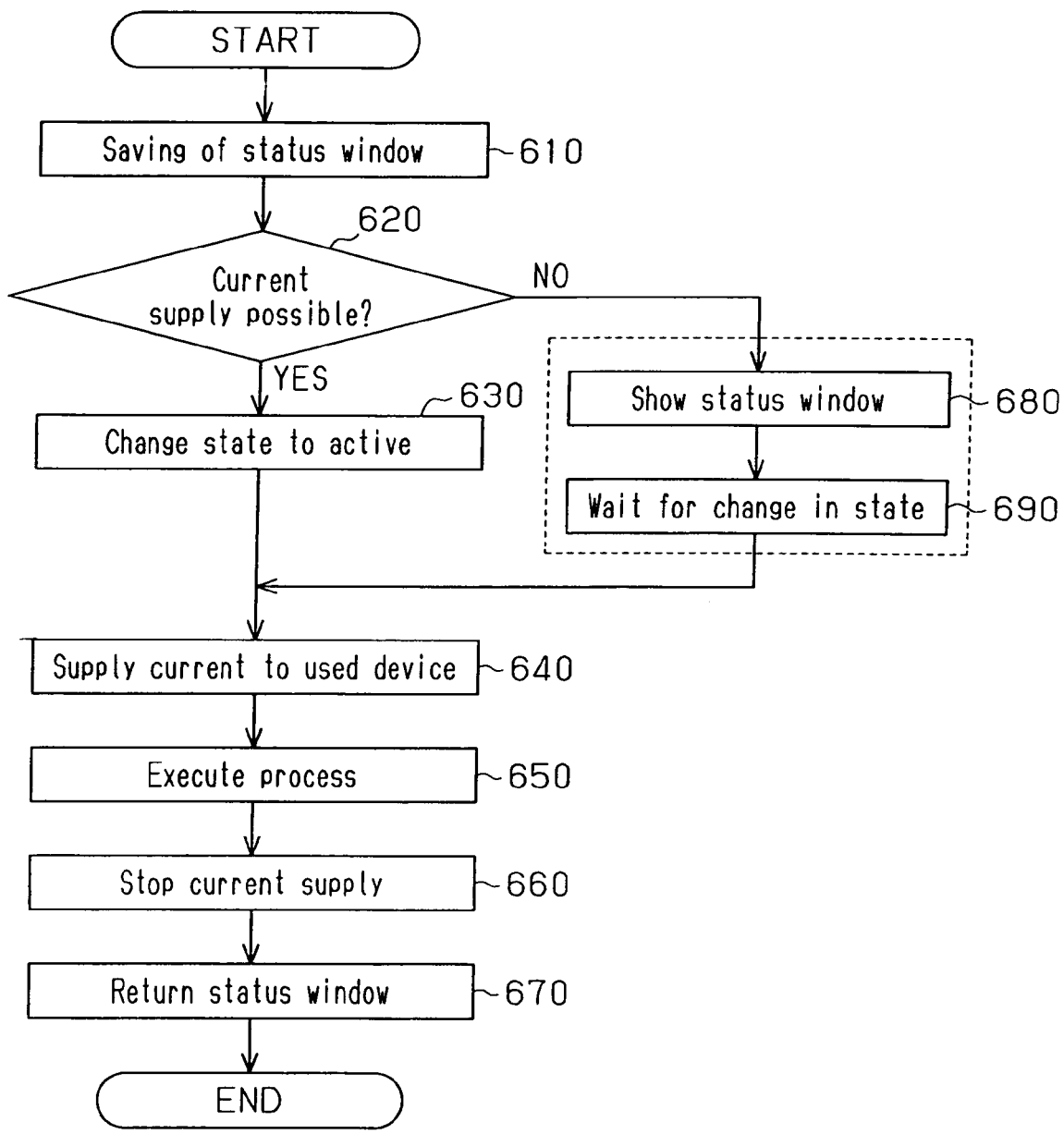
FIG. 30 is a flowchart showing the device controlling process of the sixth embodiment.

FIG. 30 is a flowchart showing a device controlling process during execution of a program such as an application.

The MPU 52 first has the status window saved in step 610. In the following step 620, the MPU 52 compares the margin current value and the requested value of the device that is to be used to determine whether or not the supply of current to that device is possible.

As for the information stored in the first region 53*a* of the memory 53, when determining that the supply of current is possible (margin current value≧requested value), the MPU 52 changes the state of the used device to "active" in step 630.

Next, the MPU 52 supplies the current of the requested value to the device that is to be used in step 640, and executes the processing of the device in step 650. After the termination of the processing, the supply of current is suspended in step 660, and the status window is returned in step 670.

When determining that the supply of current is not possible (margin current value<requested value) in step 620, the MPU 52 shows the status window in step 680. Then, the MPU 52 waits for the user to change the state in step 690. When the state is changed, the MPU 52 proceeds to step 640. That is, the state of the device that will not be used is changed to "suspend" by the user to obtain margin current.

When the state is changed by the user, it may be determined whether such a change would enable the supply of current. That is, the MPU 52 proceeds from 690 to step 620. In this case, even if the device that is to be suspended is incorrect due an operation error or the like, steps 620, 680, 690 are repeatedly executed until the margin current is obtained. This ensures the margin current.

An example in which a printing process is executed by the host apparatus 51*a* on the printer 62 will now be described.

The host apparatus 51*a* has tolerable current of 2500 mA and a margin current of 140 mA as indicated in the status window W11 of FIG. 31. The MPU 52 has the status window W11 transferred to the second region 53*b* of the memory 53, which is shown in FIG. 29.

The MPU 52 then determines whether or not the supply of current is possible. The requested value of the printer D2 is 100 mA. Therefore, even if the current of the requested value is supplied to the printer 62, the usable current will be 2460 mA and does not exceed the tolerable current of 2500 mA. Thus, the MPU 52 activates the printer D2, and executes the printing process in which a command or the like is transmitted to the printer D2. After the termination of the printing process, the MPU 52 returns the status window W11.

The host apparatus 51*a* has a tolerable current of 2500 mA and a margin current of 90 mA as indicated in the status window W12 shown in FIG. 32. The MPU 52 has the status window W12 transferred to the second region 53*b* of the memory 53, which is shown in FIG. 29.

The MPU 52 then determines whether or not the supply of current is possible. The requested value of the printer D2 is 100 mA. Therefore, when the current of the requested value is supplied to the printer D2, the tolerable current of the host apparatus 51*a* is exceeded. Thus, the operation of the device is unstable.

Therefore, the MPU 52 shows the status window W12 on the display 56 to have the user, who operates the host apparatus 51, decide whether or not to use each device. The user operates the mouse of the keyboard D1 while paying attention to the tolerable current indicated on the status window W12 and selects the OFF button for the scanner D5 that is not used in this process.

Consequently, as shown in FIG. 33, status window W13 is shown on the display 56. In the status window W13, compared to the status window W12 of FIG. 32, the present value of the fifth communication port P5 (scanner D5) is changed to 2.5 mA, and the display of state is changed to "suspend". Further, the present value of the second communication port P2 (printer D2) is changed to 100 mA, and the indication of the state is changed to "active". The printer D2 is equipment that is not operated by the bus-supplied power but by its own power source. Thus, the state of "active" is indicated in blue.

The used current is 2210 mA, and thus there is a margin current of 290 mA with respect to the tolerable current of 2500 mA. The host apparatus 51*a* executes the printing process by transmitting a command or the like to the printer D2. After the termination of the printing process, the MPU 52 returns the status window W12.

The host apparatus 51*a* of the sixth embodiment of the present invention has the advantages described below.

(1) The host apparatus 51*a*, when using a plurality of connected devices D1 to D10 during the execution of an application program, supplies the current amount requested by the device that is to be used when that device is in the suspended state. At this point of time, it is determined whether or not the total value of the current amount supplied to the plurality of devices exceeds the tolerable current amount when supplying current of the requested amount. When the total value does not exceed the tolerable current amount, the host apparatus 51a supplies the current of the requested amount to the device and activates that device. In this case, the user does not need to activate the device and thus can easily use the device without any problem. Further, since the device is activated by executing the program, the time until the device is activated is shorter compared to when the user activates the device. Further, the time until termination of the process is shorter compared to when the user activates the device.

(2) When the total value of the current amount that is to be supplied to a plurality of devices exceeds the tolerable current value, the host apparatus 51a shows the status window on the display 56 when using the devices. When the user who has checked the status window selects a button, the supply current to the selected device is reduced and the current of the requested amount is supplied to the device that is to be used. In this case, the user only selects the device that will not be used. Thus, that device is easily activated.

(3) The host apparatus 51a has the status window saved prior to changing the amount of current to be supplied to a plurality of connected devices and returns the status window after terminating the process (termination of use of device). In this case, a device in a suspended state can be used while maintaining the state of other devices as the user intends to so that a device does not have to be activated.

A seventh embodiment of the present invention will now be described.

FIG. 34 is a schematic block circuit diagram of a host apparatus 51b of the seventh embodiment.

In the seventh embodiment, the configuration of the host apparatus 51b is the same as the host apparatus 51a of the sixth embodiment shown in FIG. 29. Further, USB devices D1 to D10 are each connected to a plurality of communication ports P1 to P10 of the host apparatus 51b, which is shown in FIG. 34.

A function execution flag 53c is stored in the memory 53. As shown in FIG. 36, the function execution flag 53c indicates the state of operation of each device connected to the communication ports P1 to P10 of the host apparatus 51b. In this diagram, the devices indicated as "active" are operating, and the devices indicated as "Wait" are is a state in which operation is suspended.

An operating device has the current of the requested value supplied from the host apparatus 51b since the USB function is active. Devices in a state in which operation is suspended include a device of which USB function is in operation (active) and a device of which USB function is in suspension (Suspend). That is, devices in a suspended state includes a device in which the current of the requested value is supplied and a device in which a smaller current (e.g., 2.5 mA) corresponding to the operation mode (suspend mode) is supplied.

Like the sixth embodiment, when using an inactive device during execution of an application program or the like, the MPU 52 activates that device. When activation of the device causes the total current consumption value of all the connected devices to exceed the tolerable current value of the host apparatus 51a, the MPU 52 inactivates some of the active devices so that the total current consumption value does not exceed the tolerable current value. The MPU 52 determines the device that is to be inactivated based on the information (state of device) shown in the status window and the function execution flag 53c.

More specifically, the MPU 52 searches for a device in a suspended state (Wait) from the function execution flag 53c. Next, the MPU 52 searches from the devices in a suspended state for the device in which the USB function is active. That is, the MPU 52 supplies the current of the requested value based on the status window. The MPU 52 inactivates the USB function of the device supplying the current of the requested value and reduces the current amount that is to be supplied.

The device that is to be used through the execution of a program, such as an application, is automatically activated. When the current supplied from the host apparatus 51 to that device by such activation exceeds the tolerable current, a device that is not presently being used is automatically changed to a suspended state so as to obtain margin current. Therefore, there is no need to perform the troublesome operation of activating a device and the operation of the entire system is prevented from becoming unstable.

When there is more than one device that is in the suspended state and has an active USB function, the MPU 52 changes all of the existing devices to "suspend". Thus, a margin current is obtained and a process is executed on a device within a short period of time. The reasons for changing all the devices in the suspended state to "suspend" is in that when only some of the devices are changed to "suspend", the margin current value may not exceed the requested current consumption value of the devices that are to be used. This would require further devices to be changed to "suspend" and delay the initiation of a process.

When the operations that were expected end, the MPU 52 changes the used device to the suspended state. The termination of the device operation is performed by the inquiry from the host apparatus 51 to the device. More specifically, the MPU 52 issues a request command to check the operation state of a device via the host controller 54 at predetermined intervals, and the device transmits a response command in response. The MPU 52 checks the operation state of the device based on the received response command. In the seventh embodiment, the operation states include an auto power down state, a command terminated state, and a functioning state. When necessary, other operation states may also be included.

The request command issued to a device and the response command transmitted by that device differ depending on the type of the device. For instance, in the case of a removable disc device, "TEST UNIT READY COMMAND" is used as the request command. The host apparatus 51b issues this command, and the device replies to the command to indicate whether or not it is in a "READY state". The removable disc device generates the reply of "READY state" when the recording medium is set and generates the reply of "NOT READY state" when the recording medium is not set. Based on the received state, the host apparatus 51b sets a function execution flag in a suspended state when the removable disc device is in the "NOT READY state" since it is not in a usable state. A command for accessing the recording medium may be a request command such as a "READ SECTOR command" or "a WRITE SECTOR command". The host apparatus 51b reads the contents of the status register after termination of the data transfer. When no problem is found, the host apparatus 51b sets the function execution flag to a suspended state. When using an access command, the current of the requested value is supplied only when an access is performed. This reduces the consumption current.

The MPU 52 sets the function operation flag to a state indicating operation (active) when the device is in operation and sets the function operation flag to a state indicating a suspended state (Wait) in other cases (auto power down state or command terminated state).

When changing the state of a device, the MPU 52 performs saves the status window from the display and returns the status window in the same manner as in the sixth embodiment. Thus, after the termination of a process, a device is prevented from remaining inactive when the user does not intend to do so. Thus, the user does not have to activate the device in such a case.

Figure 35:
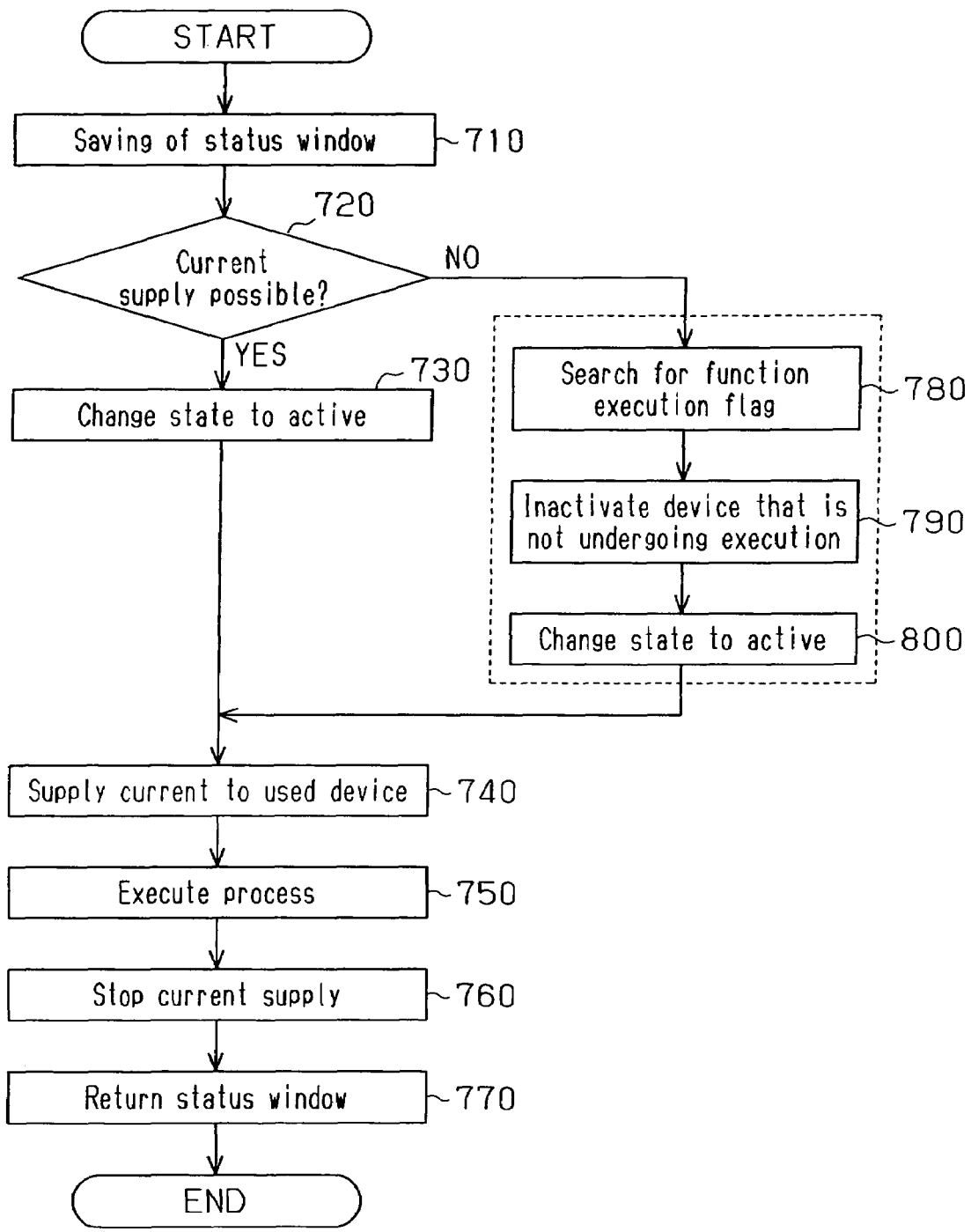
FIG. 35 is a flowchart showing the device controlling process of the seventh embodiment.

FIG. 35 is a flowchart of a device controlling process during execution of program such as an application. In the flowchart, steps 710 to 770 are substantially the same as steps 610 to 670 shown in FIG. 30.

When it is determined that the supply of current is not possible (margin current value<requested value) in step 720, based on the function execution flag, the MPU 52 searches for a device that is not executing the program in step 780. Next, the MPU 52 inactivates the device that is not executing the program in step 790. That is, the state of the device that is not used is changed to "suspend" by the host apparatus 51*b* so as to obtain margin current. The MPU 52 changes the state of the device to be used to "active" in step 800 and proceeds to step 740.

The host apparatus 51*b* of the seventh embodiment of the present invention has the advantages described below.

(1) The host apparatus 51*b* includes the function execution flag 53*c*, which indicates the operation state of the device connected to the communication ports P1 to P10. When activation of all the inactive devices causes the total consumption current value of all the connected devices to exceed the tolerable current value of the host apparatus 51*a* during execution of an application program or the like, the host apparatus 51*b* inactivates some of the active devices based on the function execution flag 53*c* so that the total consumption current value does not exceed the tolerable current value. In this case, the device that is to be used is automatically activated during execution of a program such as an application. When the activation causes the current supplied by the host apparatus 51 to the device to exceed the tolerable current, the device that is not presently used is automatically changed to the suspended state to obtain the margin current. Therefore, the device does not have to be activated. This prevents the operation of the entire system from becoming unstable.

An eighth embodiment of the present invention will now be described.

In the eighth embodiment, the configuration of the host apparatus is similar to that of the seventh embodiment shown in FIG. 34. The host apparatus 51*b* of the eighth embodiment is provided with a function for changing the function execution flag of a device that is in suspension to OFF to inactivate the USB function of that device. That is, the host apparatus 51*b* changes the state of a device to "suspend" when the function execution flag is OFF.

Therefore, the function execution flag is OFF for a device of which operation has been terminated. Further, the USB function of the device is inactivated. This reduces the current supplied from the host apparatus 51*b*.

Further, in the same manner as in the seventh embodiment, when using an inactive device during execution of an application program or the like, the host apparatus 51*b* of the eighth embodiment activates that device. When doing so, the device of which operation has been terminated is inactivated and supplied with current (e.g., 2.5 mA) that enables minimum communication (device reset or reception of data signal). Thus, unnecessary current is not supplied to a device that is not in use. The presently used current amount is small compared to the tolerable current amount, and the host apparatus 51*b* thus has a sufficient requested current amount. Therefore, the host apparatus 51*b* activates the USB function of the device that is to be used, that is, changes the state of the status window to "active" and supplies the requested current.

When the activation of the device causes the total consumption current value of all the connected devices to exceed the tolerable current value, some of the devices must be inactivated to obtain the current amount that is to be supplied. However, the device for which operation has been terminated is inactivated and supplied with current enabling only minimum communication. Thus, as in the seventh embodiment, the host apparatus 51*b* cannot obtain the supply current amount by inactivating the device.

Therefore, the host apparatus 51*b* shows a status window on the display 56 serving as the display device to notify the user of the supply state of the current. Further, the host apparatus 51*b* shows a warning window on the display 56 to have the user, who is operating the host apparatus 51, decide whether or not to continue the process.

Figures 38, 39:
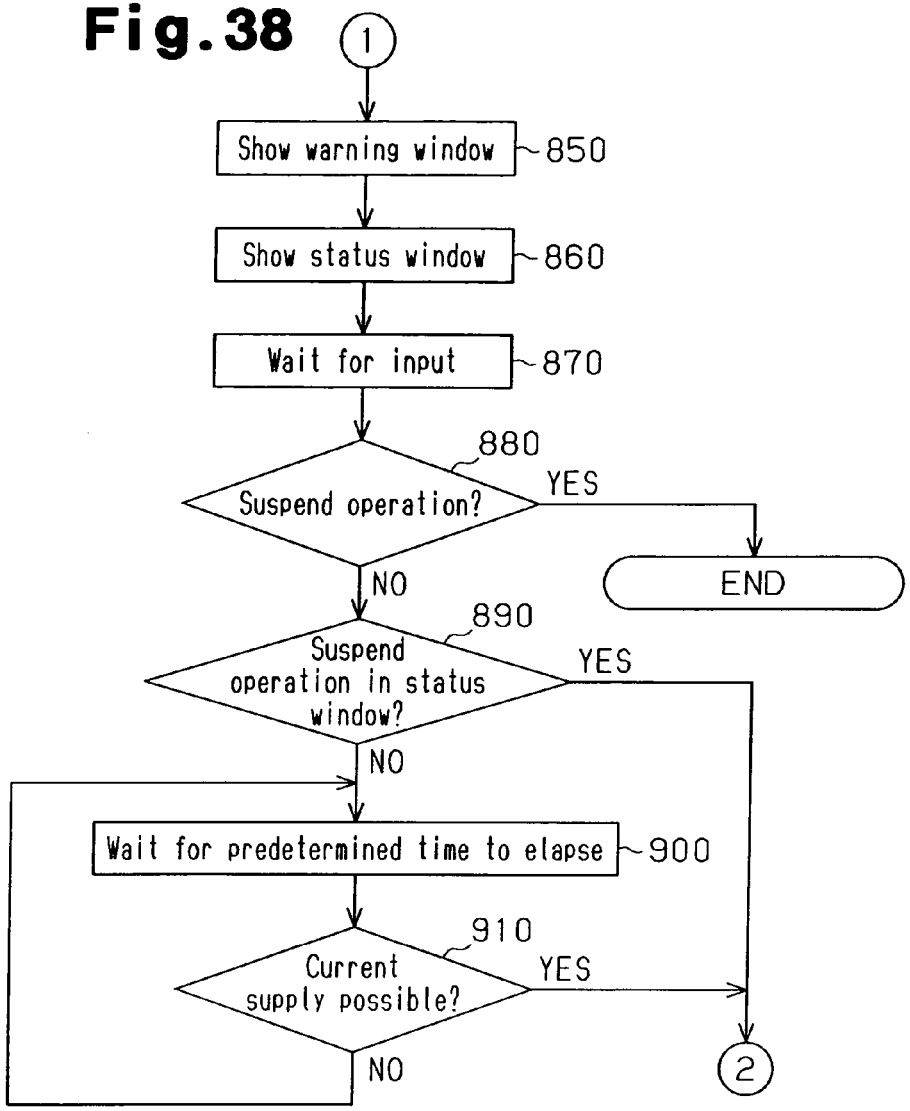
FIG. 38 is a flowchart showing the device controlling process of the eighth embodiment.
FIG. 39 is an explanatory diagram showing a warning window.
Figure 40:
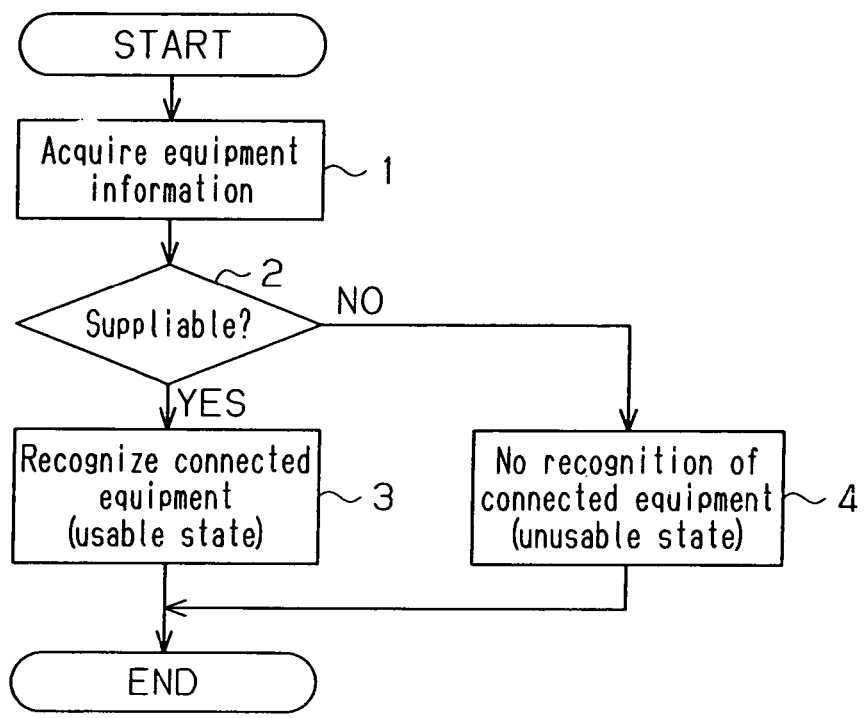
FIG. 40 is a flowchart showing the process for connection recognition of the new device.
Figure 41:
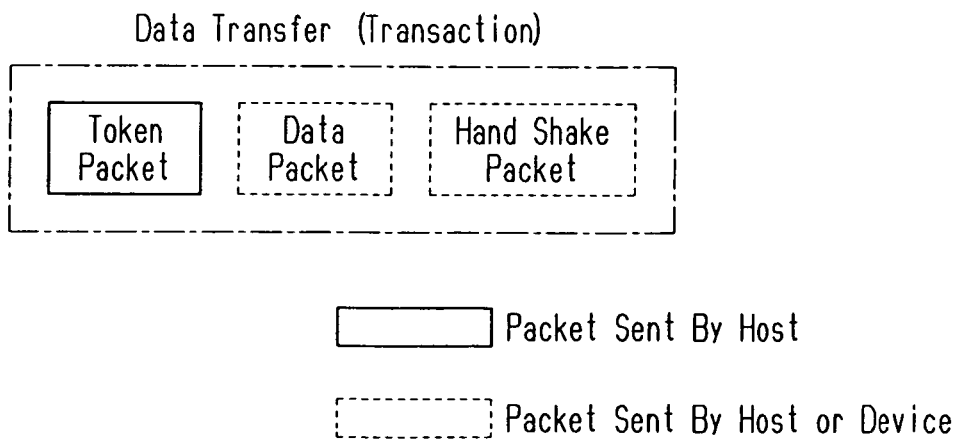
FIG. 41 is an explanatory diagram for explaining data transfer of a USB.

As shown in FIG. 39, a warning message and a plurality of (three in FIG. 39) items are displayed on the warning window W21. In the present embodiment, the first item is for suspending the present operation, the second item is for suspending an operation other than that of the first item, and the third item is for waiting until there is enough power.

The user operates the mouse of the keyboard 61 and selects one of the three items. When the user selects the first item, the host apparatus 51*b* suspends the operation that is to be presently executed. For instance, when performing printing using the printer 62 by executing a program such as an application, the operation, or printing process, of the printer 62 is suspended.

When selecting the second item, the user operates the mouse of the keyboard 61 and selects the selector (ON/OFF) of the communication port to which the device that is to be suspended is connected while paying attention to the tolerable current indicated on the status window. The host apparatus 51*b* reduces the current amount supplied to the selected communication port and inactivates the USB function of the device connected to that communication port. This obtains sufficient margin current amount for the supply of the current requested by the operating device, and the host apparatus 51*b* supplies the current of the requesting amount to the device that is to be used and activates the USB function of that device.

When the user selects the third item, the host apparatus 51*b* waits until there is enough power, that is, until the other devices are suspended. The device in which the function execution flag is presently in ON sets the function execution flag to OFF when operation is terminated and the USB function is inactivated. The inactivation reduces the current amount supplied from the host apparatus 51*b* to the device and increases the margin current amount. Therefore, the host apparatus 51*b* suspends and inactivates devices other than the device that is to be activated and waits until the margin current amount becomes larger than the requested value of the device that is to be activated.

The host apparatus 51*b* compares the margin current amount and the requested value of the device that is to be activated for every predetermined time and waits until the margin current amount becomes larger than the requested value. When the margin current amount becomes larger than the requested value, the host apparatus 51*b* supplies the current of the requested amount to the device that is to be used and activates the USB function of that device.

FIGS. 37 and 38 are flowcharts of a device controlling process for use during execution of a program such as an application.

The MPU 52 first compares the margin current value and the requested value of the device that is to be used and determines whether the current can be supplied to the device.

When the current can be supplied (margin current value≧requested value), the MPU 52 changes the state of the used device to "active" in the information stored in the first region 53a of the memory 53 in step 820. Next, the MPU 52 changes the function execution flag to ON in step 830. The MPU 52 supplies the current of the requested value to the used device in step 840.

Then, the MPU 52 executes a process on the device. The current of the requested value is supplied from the host apparatus 51b, and the USB function of the device is activated and operated in response to the data transmitted from the host apparatus 51b in accordance with the process. When the operation is terminated, the function execution flag of the device in suspension is changed to OFF, and the function of the USB function of the device which function execution flag is turned OFF is inactivated. The process of inactivating the device is performed independent of the execution of the program of application or the like executed by the host apparatus 51b. Thus, the host apparatus 51b does not have to wait until the process executed by the device is terminated and may execute the next process.

When it is determined that the current cannot be supplied in step 810, the MPU 52 shows the warning window W21 in step 850 and shows the status window in step 860. The MPU 52 then waits for the user to input at least one of either the warning window W21 or the status window in step 870.

This is because the warning window W21 in the eighth embodiment includes an item (second item) that requires an input to the status window. Accordingly, the processes and the order of steps 850 to 870 may be changed if necessary. For instance, the warning window may be displayed, operation may be suspended until there is an input to the window, and the status window may be shown as required.

In step 880, the MPU 52 determines whether or not the input in step 870 is "suspend operation". When the input is "suspend operation", the MPU 52 terminates the process of that device. For instance, when performing printing during the execution of the application, the printer (refer to FIG. 29) is used. If there is not enough margin current to use the printer 62 and operation suspension is selected in step 870, the MPU 52 interrupts the process that uses the printer 62 and resumes the execution of the application.

When determining that the input is not "suspend operation" in step 880, the MPU 52 determines whether or not the operation in the status window is suspended in step 890. Suspension is determined by switching of the selector. That is, the MPU 52 determines whether the button of the selector column displayed in the status window is switched or not. When switched, the MPU 52 proceeds to step 820 as shown in FIG. 37 and executes the subsequent processes. When a button of the selector column has been switched, it may be determined whether or not the supply of power is possible, that is, the MPU 52 may proceed to step 810.

When the input does not suspend the operation in the status window, that is, "wait until enough power" is selected in the eighth embodiment in step 890, the MPU 52 waits until power can be supplied. That is, the MPU 52 waits for a predetermined time to elapse in step 900 and determines whether or not the supply of power is possible based on the margin current amount in step 910. When the supply of power is not possible, the MPU 52 proceeds to step 900. That is, step 900 and step 910 are repeatedly executed to wait until the supply of power becomes possible.

In step 910, when determining that the supply of power is possible, the MPU 52 proceeds to step 820 shown in FIG. 37 and executes the subsequent processes.

The host apparatus 51b of the eighth embodiment of the present invention has the following advantages.

(1) The host apparatus 51b changes the function execution flag of the device in suspension to OFF and inactivates the function of the USB function of the device of which function execution flag is OFF. In this case, the device of which operation is terminated has the function execution flag set to OFF. Further, since the USB function of the device is inactivated, the current supplied from the host apparatus 51b is reduced, and the consumption current is reduced.

(2) The host apparatus 51b shows the status window on the display 56 serving as the display device and notifies the supply state of the current to the user. Further, the host apparatus 51b shows the warning window on the display 56 to have the user who is operating the host apparatus 51 decide whether or not to continue the process etc. When the user selects to continue the process, the host apparatus 51b waits until the supply of current becomes possible. Thus, the process may easily be continued. When the user selects to stop the process, the process that uses the device is interrupted, and other processes are executed.

The above embodiments may be modified in the following manner.

In the first embodiment, the maximum consumption current field of the configuration descriptor is used for the host apparatus 11 to inquire the change in supply current to each device 21 to 23. However, the present invention is not limited in such a manner. The field of a descriptor other than the configuration descriptor may be used, a new descriptor or field may be set, and negotiation may be performed to change the supply current using the new field and the like.

Figure 2:
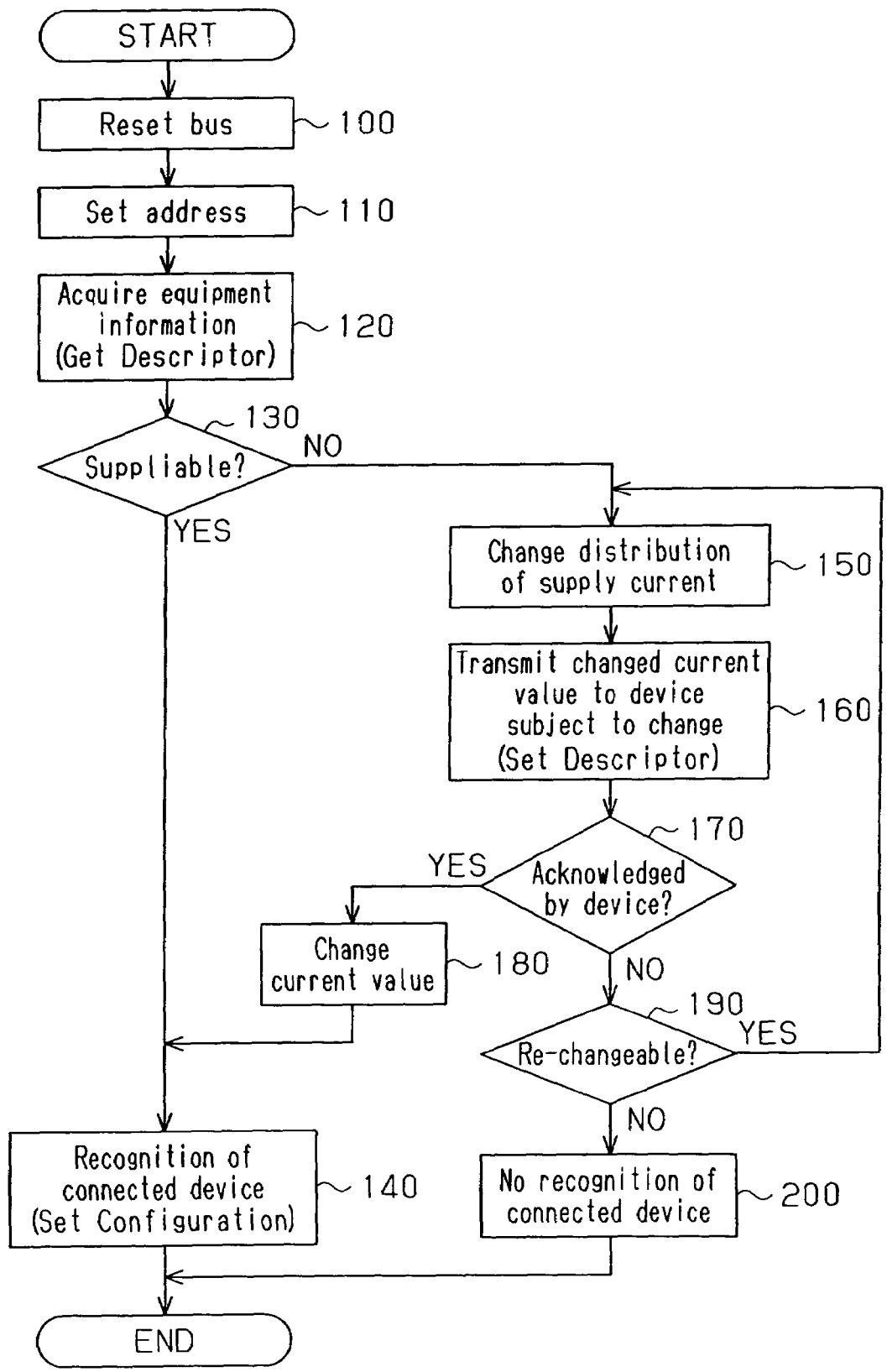
FIG. 2 is a flowchart showing a process for connection recognition of a new device.

In the first embodiment, the MPU 12 executes the processes of FIG. 2. However, a control section for executing the processes of FIG. 2 may be arranged in the host controller 14. Further, in the second to the fourth embodiments, the MPU 33 executes the processes of FIG. 11, FIG. 13 and FIG. 14. However, a control section arranged in the USB controller 35 may execute such processes. In this way, the processing load of the MPUs 12 and 33 is reduced. This is preferable from a practical standpoint.

In the device 31 of FIG. 9, a level switch (switch for setting the read or write speed of data) for switching the consumption current of the internal circuits may be used. In this case, in the same manner as in the third embodiment, the consumption current stored in the register 36a is changed in accordance with the set value of the level switch. After the change, the device temporarily enters a disconnected state due to the switching operation of the switch unit 42. In this way, the device 31 may be operated at an appropriate supply current corresponding to the set value of the level switch.

The switch units 42 (refer to FIG. 10) in the second to fourth embodiments may be replaced by a switch unit 42A shown in FIG. 28. That is, the switch unit 42A of FIG. 28 includes a plurality of switching elements (MOS transistors) Tr1, Tr2, and Tr3 and controls each switching element Tr1 to Tr3 to have the host apparatus 41 recognize the disconnection of the device 31. More specifically, in the device 31 operating at full speed, the switching element Tr1 is turned OFF by the control signal S1 from the MPU 33 and the pull-up resistance R1 of the signal line D+, which conveys the communication data, is broken. Thus, the signal lines D+ and D− are in a state referred to as "SE0", and the host apparatus 41 is able to recognize that the device 31 has been disconnected. Further, in the device 31 operating at high speed, the switching elements Tr2 and Tr3 are turned PFF by the control signals S2 and S3 from the MPU 33, and the signal lines D+ and D− for conveying the communication data are in the high impedance state. Thus, the voltage level of the signal lines D+ and D−exceeds the disconnection voltage value (e.g., 625 mV) of the USB standard, and the host apparatus 41 recognizes that the device 31 has been disconnected.

The current monitoring current 16 and the switch circuit 25 in the host apparatus 11 of the first embodiment may be omitted. Further, the limiter 58 in the host apparatus 51 of the fifth embodiment may be omitted. The omission of the circuit 16, 25, and 28 lowers the cost of the host apparatuses 11 and 51.

In the device 31 of the second and the fourth embodiments, a switch circuit 36b for disconnecting the current path is arranged in the power controller 36, and the switch circuit 36b is turned OFF when the device 31 is not recognized (step 270 of FIG. 11) so as to disconnect the power source of the device 31. In a device in which the switch circuit 36b for disconnecting the current path is not arranged, in step 270 of FIG. 11, the operation mode is set to the waiting mode with the minimum consumption current of the internal circuits. In this way as well, the unnecessary current consumption of the device is prevented.

In each embodiment, the communication system connects the host apparatus 11, 41, and 51 to the devices 21 to 23, 31, 43, 61 to 67, 71 to 73 with the USB interface. However, a communication system for connection with communication interfaces other than the USB interface may be employed.

In the sixth and seventh embodiments, saving of a status window does not have to be performed.

In the seventh embodiment, the order of the devices for reducing the supply current based on the function execution flag may be set in advance. That is, there may be a list on which the order of reducing the supply current is recorded. The order may be set as required. For example, the order may be set by a user, the order may be set to reduce the supply current from the devices that are used less frequently, or the order may be set to reduce the supply current from devices having lower priority.

In the seventh embodiment, in addition to when inactivating a device that is temporarily used during execution of a program, while a device is connected to a host apparatus, it may be determined whether that device is operating to inactivate the USB function if that device is not operating. In such a case, the current supply of the device that is not operated is automatically stopped. This reduces the consumed power of the entire system.

In the seventh and the eighth embodiments, a device may provide notification of the operation state (auto power down state, command terminated state, function in operation) at every predetermined time interval. In this case, the host apparatus does not have to issue a request command to the device. This reduces the overhead with respect to the normal process in the host apparatus and high speed processing is achieved.

In the eighth embodiment, the content of the warning window W21 and the process may be changed if necessary. For instance, when there is no margin current that can be supplied to the used device, operation is suspended until current supply becomes possible, and a display indicating an inquiry for a decision to wait or interrupt the process may be shown on the window.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

The invention claimed is:

1. A device for receiving power from a host apparatus through a bus that performs serial communication, the device comprising:
   an internal circuit including a communication circuit for performing communication with the host apparatus through the bus and operating based on the communication data transmitted and received by the communication circuit; and
   a control circuit, connected to the internal circuit, for reducing the consumption current if the consumption current of the internal circuit exceeds the current that the host apparatus is capable of supplying when the device is connected to the host apparatus.

2. The device according to claim 1, further comprising:
   a switch unit, connected to the communication circuit, for temporarily disconnecting the bus and the communication circuit after the control circuit reduces the consumption current.

3. The device according to claim 1, wherein:
   the bus is a universal serial bus;
   the communication circuit performs data communication in compliance with the universal bus standard to transmit a value consumption current value for the internal circuit to the host apparatus; and
   the control circuit determines whether or not the host apparatus has issued a request command requesting activation of the device, and reduces the consumption current of the internal circuit when the request command has not been issued.

4. The device according to claim 1, wherein:
   the bus is a universal serial bus;
   the communication circuit performs data communication in compliance with the universal bus standard to transmit a consumption current value of the internal circuit to the host apparatus; and
   when notified by the host apparatus of the current that the host apparatus is capable of supplying, the control circuit reduces the consumption current of the internal circuit in accordance with the current that the host apparatus is capable of supplying.

5. The device according to claim 1, further comprising a setting unit, connected to the control circuit, for setting the value of the consumption current value of the internal circuit, wherein the control circuit changes the consumption current of the internal circuit in accordance with the set value of the setting unit.

6. The device according to claim 1, further comprising a switch circuit, connected to the control circuit, for breaking a current path of the current supplied from the bus when the control circuit determines that the consumption current of the internal circuit cannot be reduced.

* * * * *